US012654580B2

(12) United States Patent
Saita et al.

(10) Patent No.: US 12,654,580 B2
(45) Date of Patent: Jun. 16, 2026

(54) CONTROLLING CHARGING BASED ON CHARGER CONNECTION STATE

(71) Applicant: HONDA MOTOR CO., LTD., Tokyo (JP)

(72) Inventors: Akira Saita, Tokyo (JP); Hironobu Taniguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 695 days.

(21) Appl. No.: 18/101,588

(22) Filed: Jan. 26, 2023

(65) Prior Publication Data

US 2023/0264587 A1    Aug. 24, 2023

(30) Foreign Application Priority Data

Feb. 18, 2022    (JP) ................................ 2022-023802

(51) Int. Cl.
*B60L 53/60*        (2019.01)
*H02J 7/60*        (2026.01)
*H02J 7/70*        (2026.01)
*H02J 7/92*        (2026.01)

(52) U.S. Cl.
CPC .............. *B60L 53/60* (2019.02); *H02J 7/685* (2026.01); *H02J 7/70* (2026.01); *H02J 7/92* (2026.01)

(58) Field of Classification Search
CPC ..................................................... B60L 53/60
USPC ......................................................... 320/109
See application file for complete search history.

(56) References Cited

U.S. PATENT DOCUMENTS

| | | | |
|---|---|---|---|
| 8,075,329 B1 | 12/2011 | Janarthanam et al. | |
| 2010/0204859 A1 | 8/2010 | Kamaga | |
| 2011/0210698 A1* | 9/2011 | Sakai | H02J 7/04 |
| | | | 320/109 |
| 2015/0326050 A1* | 11/2015 | Baek | H02J 9/005 |
| | | | 320/137 |
| 2015/0376932 A1 | 12/2015 | Imai et al. | |
| 2018/0072171 A1* | 3/2018 | Han | B60L 53/31 |

(Continued)

FOREIGN PATENT DOCUMENTS

| | | |
|---|---|---|
| CN | 105278403 | 1/2016 |
| CN | 112895929 | 6/2021 |
| JP | 2009-060728 | 3/2009 |

(Continued)

OTHER PUBLICATIONS

Japanese Notice of Allowance for Japanese Patent Application No. 2022-023802 mailed Nov. 21, 2023.

(Continued)

*Primary Examiner* — Yalkew Fantu
(74) *Attorney, Agent, or Firm* — Amin, Turocy & Watson, LLP

(57) ABSTRACT

Provided is a charging control system for an electric vehicle capable of being charged from an external power source. The charging control system includes an inlet which is provided in the electric vehicle and to which a charging gun including an operable S3 switch is connected, and a charging control ECU capable of controlling the charging and performing a setting of timer charging. The charging control ECU cancels the setting of the timer charging on the basis of a predetermined operation on the S3 switch in a state in which the setting of the timer charging has been performed.

7 Claims, 20 Drawing Sheets

(56)           References Cited

U.S. PATENT DOCUMENTS

2019/0061654 A1 *   2/2019   Tsuji ...................... B60R 16/03
2021/0170898 A1     6/2021   Ando

FOREIGN PATENT DOCUMENTS

| JP | 2012-070538 | 4/2012 |
|----|-------------|--------|
| JP | 2013-194498 | 9/2013 |
| JP | 2014-166051 | 9/2014 |
| JP | 2015-042075 | 3/2015 |
| JP | 2016-059248 | 4/2016 |
| JP | 6337709     | 6/2018 |
| JP | 2020-061801 | 4/2020 |
| JP | 2020-061802 | 4/2020 |
| JP | 2021-114881 | 8/2021 |

OTHER PUBLICATIONS

Chinese Office Action for Chinese Patent Application No. 202211690407.2 mailed Jun. 30, 2025.
Japanese Office Action for Japanese Patent Application No. 2023-213296 mailed Dec. 3, 2024.

* cited by examiner

*FIG. 13*

CONTROLLING CHARGING BASED ON CHARGER CONNECTION STATE

CROSS-REFERENCE TO RELATED APPLICATION

Priority is claimed on Japanese Patent Application No. 2022-023802, filed in Japan on Feb. 18, 2022, the entire content of which is incorporated herein by reference.

BACKGROUND OF THE INVENTION

Field of the Invention

The present invention relates to a charging control system.

Description of Related Art

In recent years, in order to reduce adverse effects on the global environment, vehicles such as electric vehicles and plug-in hybrid vehicles have been developed in which in-vehicle power storage devices can be charged from the outside.

For example, Japanese Unexamined Patent Application, First Publication No. 2014-166051 (hereinafter, Patent Literature 1) discloses a vehicle charging device that performs timer charging for waiting without charging until a set time in a case where a charge start time for an in-vehicle power storage device is set. The charging device includes a charger that charges the power storage device by receiving electric power from the outside of the vehicle, and a control unit that determines whether to perform timer charging or to perform immediate charging without performing timer charging, on the basis of a state of a switch related to opening and closing of a charging lid, and controls the charger. For example, a timer release switch (switch for releasing the setting of timer charging) or a timer fixing switch (switch for enabling the setting of timer charging) also serves as a switch for detecting opening/closing of the lid or a switch for opening the lid.

For example, Japanese Patent No. 6337709 (hereinafter, Patent Literature 2) discloses a vehicle capable of external charging in which by an in-vehicle battery is charged by using power of an external power source. This vehicle includes an inlet to which a plug on the external power source side is connected, a detection device that detects whether or not the plug is connected to the inlet, and a control device that reserves execution of the external charging on the basis of a time set by a user in a case where the plug is connected to the inlet. In a case where the plug is connected to the inlet and the execution of the external charging is reserved, the control device cancels the reservation of the execution of the external charging when an operation of inserting and removing the plug in and from the inlet is repeated a predetermined number of times within a reception period of reservation cancellation.

SUMMARY OF THE INVENTION

However, in the case of Patent Literature 1, when the switch fails, the user may not be able to cancel the setting of timer charging. In the case of Patent Literature 2, it takes time and effort to repeat the operation of inserting and removing the plug, and the user may be forced to perform a bothersome operation.

Meanwhile, in a charging control system for an electric vehicle that can be charged from an external power source, a charging schedule may be set. For example, the charging schedule setting includes timer charging reservation (setting of timer charging) in a charging execution time period, charging end SOC (State Of Charge) setting, and the like. In such a charging control system, there is a case where it is desired to cancel the charging schedule setting due to the convenience for the user after setting the charging schedule. In such a case, it is required to cancel the charging schedule setting by a simple operation for the user.

An aspect according to the present invention has been made in view of such circumstances, and an object thereof is to provide a charging control system capable of canceling a charging schedule setting with a simple operation.

In order to solve the above problems and achieve the object, the present invention adopts the aspects described below.

(1) A charging control system according to an aspect of the present invention is a charging control system for an electric vehicle capable of being charged from an external power source, and the charging control system includes a connection portion which is provided in the electric vehicle and to which a charger including an operable switch is connected, and a control unit capable of controlling the charging and performing a schedule setting of the charging. The control unit cancels the schedule setting on a basis of a predetermined operation of the switch in a state in which the schedule setting has been performed.

(2) In the above aspect (1), the control unit may be capable of detecting fitting and half-fitting as connection states of the charger with respect to the connection portion, the charger may be capable of being in a state of the half-fitting on a basis of the predetermined operation of the switch, and the control unit may cancel the schedule setting in a case where, after the fitting is detected, the half-fitting is detected and then the fitting is detected again.

(3) In the above aspect (2), the control unit may cancel the schedule setting in a case where the switch is pressed for a second period or longer within a first period after the charger is connected to the connection portion.

(4) In the above aspect (3), the control unit may cancel the schedule setting in a case where a state in which the switch is not pressed is continued for a third period or longer after the switch is pressed for the second period or longer within the first period.

(5) In the above aspect (3) or (4), the charging control system may start the charging after the schedule setting is cancelled, and further may include a lock mechanism that locks the charger and the connection portion, and an unlock switch for releasing the lock, and the control unit may restrict the cancellation of the schedule setting in a case where the unlock switch is pressed.

(6) In any one of the aspects (2) to (5), a determination unit that determines an abnormality related to detection of the fitting state may be further provided, and the control unit may switch to a control mode for the abnormality in a case where the determination unit has determined the abnormality.

(7) In the above aspect (6), the determination unit may determine the abnormality in a case where the control unit does not detect the half-fitting when connecting the charger to the connection portion or when detaching the charger from the connection portion.

According to the above aspect (1), as a result of a configuration in which a charging control system for an electric vehicle capable of being charged from an external power source includes a connection portion which is provided in the electric vehicle and to which a charger including an operable switch is connected, and a control unit capable of controlling the charging and performing a schedule setting of the charging, and the control unit cancels the schedule setting on a basis of a predetermined operation of the switch in a state in which the schedule setting has been performed, the following effects can be obtained.

When the user operates the switch in a state where the schedule setting of charging is performed, the schedule setting is canceled by the control unit on the basis of a predetermined operation on the switch. Therefore, the charging schedule setting can be canceled by a simple operation.

According to the above aspect (2), as a result of a configuration in which the control unit is capable of detecting fitting and half-fitting as connection states of the charger with respect to the connection portion, the charger is capable of being in a state of the half-fitting on a basis of the predetermined operation of the switch, and the control unit cancels the schedule setting in a case where, after the fitting is detected, the half-fitting is detected and then the fitting is detected again, the following effects can be obtained.

In a case where the half-fitting is detected between fittings that are temporally before and after the half-fitting, this is regarded as the predetermined operation of the switch based on the intention of the user, and the schedule setting can be canceled. In addition, it is possible to suppress cancellation of the schedule setting by an erroneous operation of the user as compared with the case where the schedule setting is canceled only by the change from the fitting to the half-fitting.

According to the above aspect (3), as a result of a configuration in which the control unit cancels the schedule setting in a case where the switch is pressed for a second period or longer within a first period after the charger is connected to the connection portion, the following effects can be obtained.

In a case where the switch is pressed for a second period or longer within a first period, this is regarded as the predetermined operation of the switch based on the intention of the user, and the schedule setting can be canceled. In addition, it is possible to suppress cancellation of the schedule setting by an erroneous operation of the user as compared with the case where the schedule setting is canceled only when the switch is pressed for a period shorter than the second period within the first period.

According to the above aspect (4), as a result of a configuration in which the control unit cancels the schedule setting in a case where a state in which the switch is not pressed is continued for a third period or longer after the switch is pressed for the second period or longer within the first period, the following effects can be obtained.

In a case where a state in which the switch is not pressed is continued for a third period or longer after the switch is pressed for the second period or longer within the first period, this is regarded as a predetermined operation on the switch based on the intention of the user, and the schedule setting can be cancelled. In addition, it is possible to suppress cancellation of the schedule setting by an erroneous operation of the user as compared with the case where the schedule setting is canceled only when the switch is pressed for the second period or longer within the first period.

According to the above aspect (5), as a result of a configuration in which the charging control system starts the charging after the schedule setting is cancelled, and further includes a lock mechanism that locks the charger and the connection portion, and an unlock switch for releasing the lock, and the control unit restricts the cancellation of the schedule setting in a case where the unlock switch is pressed, the following effects can be obtained.

In a case where the unlock switch is pressed, the release of the lock between the charger and the connection portion is regarded as being based on the intention of the user, and the cancellation of the schedule setting can be restricted.

According to the above aspect (6), as a result of a configuration in which a determination unit that determines an abnormality related to detection of the fitting state is further provided in the charging control system, and the control unit switches to a control mode for the abnormality in a case where the determination unit has determined the abnormality, the following effects can be obtained.

When the abnormality related to the detection of the fitting state is determined, the control mode can be switched to the control mode for abnormality.

According to the above aspect (7), as a result of a configuration in which the determination unit determines the abnormality in a case where the control unit does not detect the half-fitting when connecting the charger to the connection portion or when detaching the charger from the connection portion, the following effects can be obtained.

In a case where the half-fitting is not detected when the user connects the charger to the connection portion or when the user detaches the charger from the connection portion, this can be determined as an abnormality regarding the detection of the fitting state.

BRIEF DESCRIPTION OF THE DRAWINGS

FIG. 13 is an explanatory diagram of an example of an activation factor from a charging facility side immediately before a removal operation of the charging gun of the embodiment;

DETAILED DESCRIPTION OF THE INVENTION

Hereinafter, an embodiment of the present invention will be described with reference to the drawings. In the embodiment, a charging control system of an electric vehicle capable of being charged from an external power source by a charging gun (an example of a charger) will be described. Hereinafter, the electric vehicle may be simply referred to as a "vehicle".

<Charging Control System>

Figure 1:
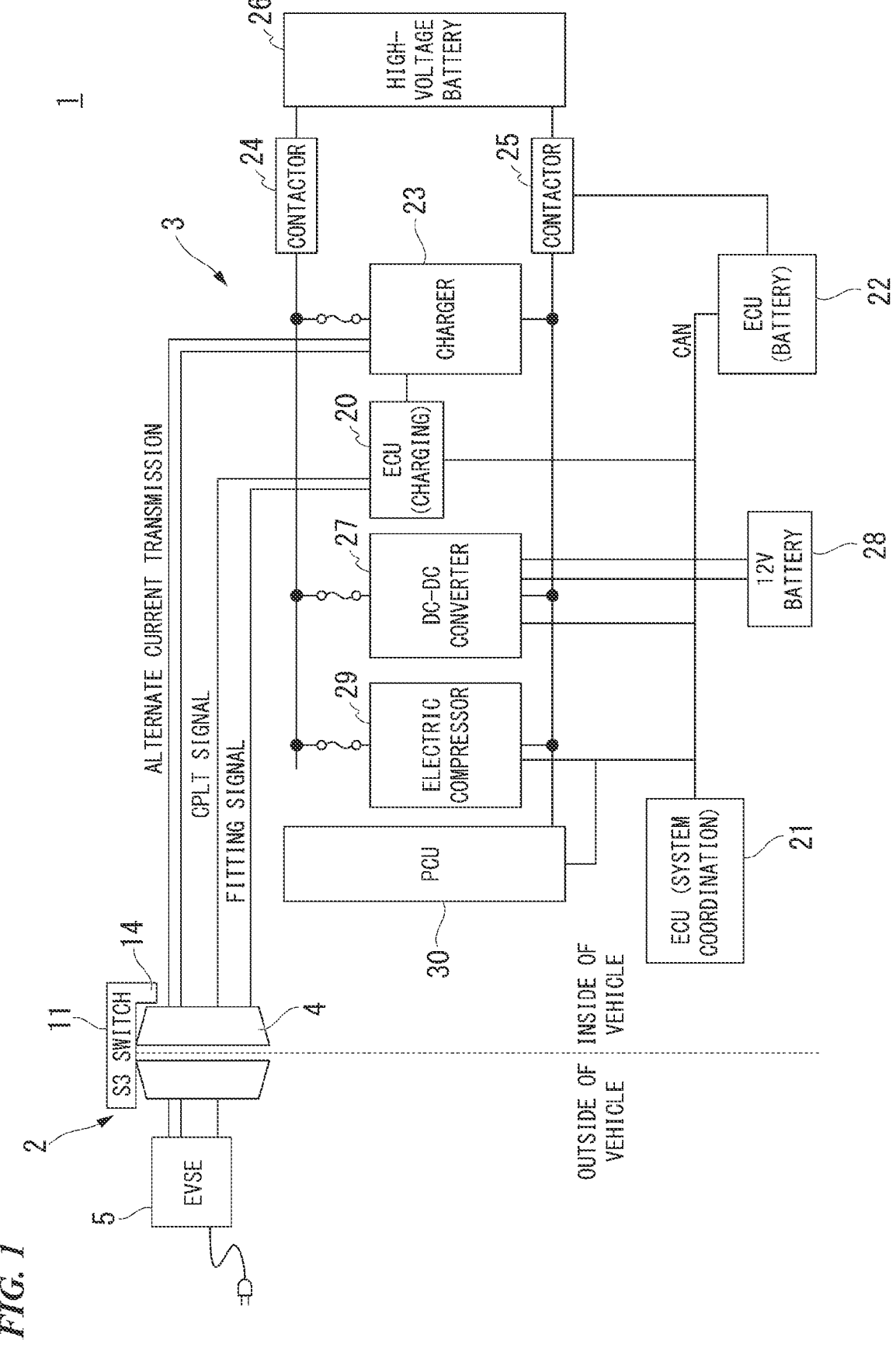
FIG. 1 is an overall configuration diagram of a charging control system of an embodiment.

As illustrated in FIG. 1, a charging control system 1 is configured to be able to charge an electric vehicle 3 from an external power source by connecting a charging gun 2 to an inlet 4 (an example of a connection portion to which the charger is connected) on the vehicle side.

The charging gun 2 has a switch 11 operable by a user. Hereinafter, the switch of the charging gun 2 may be referred to as an "S3 switch". For example, the charging gun 2 is connected to a charging cable 5 (electric vehicle supply equipment: EVSE). The charging gun 2 is connected to the inlet 4 by fitting. The S3 switch 11 has an engagement protrusion 14 engageable with the inlet 4.

The electric vehicle 3 includes an inlet 4, electronic control units (ECUs) 20, 21, and 22, a charger 23, contactors 24 and 25, a high-voltage battery 26, a DC-DC converter 27, a 12-V battery 28, an electric compressor 29, and a power control unit (PCU) 30. The constituent elements of the electric vehicle 3 are electrically connected to elements related to each other by various wirings or the like.

The inlet 4 is provided in the electric vehicle 3. The inlet 4 is a connection portion to which the charging gun 2 is connected in order to receive power supplied from an external power source. For example, the inlet 4 is provided at a portion of the electric vehicle 3 that can be exposed to the outside of the vehicle. For example, in a state where the inlet 4 is exposed to the outside of the vehicle, the charging gun 2 can be fitted to the inlet 4.

The electric vehicle 3 includes a plurality of (three in the example of FIG. 1) ECUs 20, 21, and 22. The three ECUs 20, 21, and 22 include an ECU (hereinafter, also referred to as a "charging control ECU") 20 that controls charging of the electric vehicle 3, an ECU (hereinafter, also referred to as a "system coordination ECU") 21 that controls coordination of constituent elements of the charging control system 1, and an ECU (hereinafter, also referred to as a "battery control ECU") 22 that controls the batteries 26 and 28.

The charging control ECU 20 (an example of a control unit) can communicate with the inlet 4 by a control pilot signal (hereinafter, also referred to as a "CPLT signal"), a fitting signal, and the like. The charging control ECU 20 is electrically connected to the charger 23. The charger 23 is capable of alternate current power transmission with the inlet 4. The system coordination ECU and the battery control ECU can communicate with related elements through a controller area network (CAN).

<Change in Fitting State When Charging Gun Is Connected to Inlet>

Figure 2:
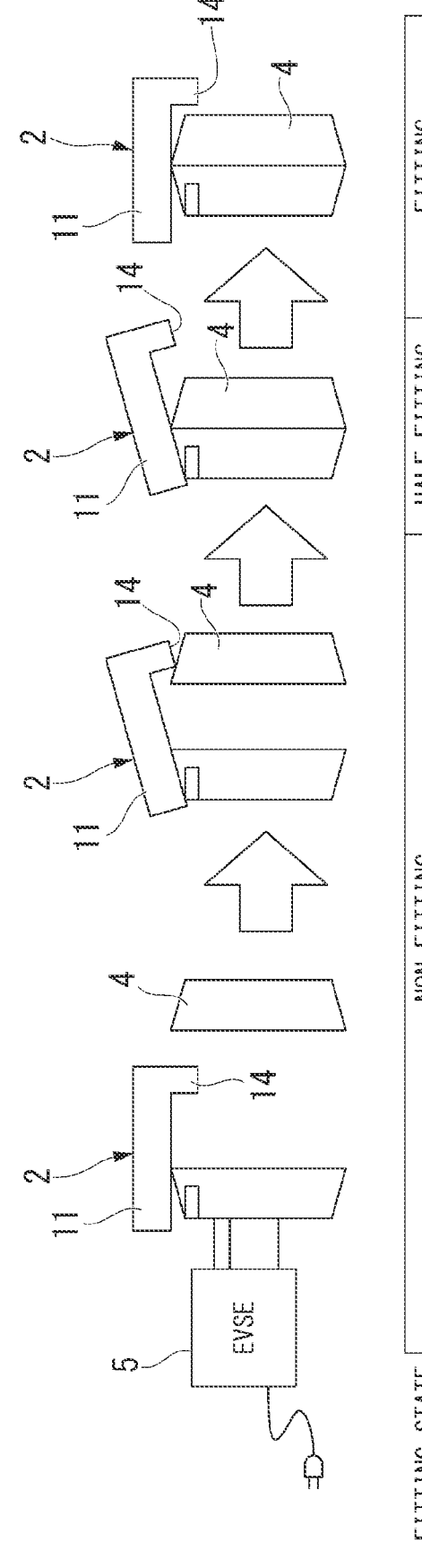
FIG. 2 is an explanatory diagram of a change in a fitting state when a charging gun of the embodiment is connected to an inlet.

As illustrated in FIG. 2, the fitting state when the charging gun 2 is connected to the inlet 4 changes in the order of "non-fitting", "half-fitting", and "fitting". Here, the non-fitting is a state in which the charging gun 2 is not connected to the inlet 4. The half-fitting is a state in which the charging gun 2 is connected to the inlet 4 but the engagement protrusion 14 has not completely lowered. The fitting is a state in which the charging gun 2 is connected to the inlet 4 and the engagement protrusion 14 has completely lowered.

For example, the user can raise the engagement protrusion 14 and connect the charging gun 2 to the inlet 4 by pressing the S3 switch 11 when connecting the charging gun 2 to the inlet 4. Even if the user does not press the S3 switch 11 when connecting the charging gun 2 to the inlet 4, the user can push the charging gun 2 toward the inlet 4 to raise the engagement protrusion 14 and connect the charging gun 2 to the inlet 4. When the charging gun 2 is connected to the inlet 4, the engagement protrusion 14 is lowered, and the charging gun 2 is connected to the inlet 4 by fitting.

<Change in Fitting State When Charging Gun Is Removed from Inlet>

Figure 3:
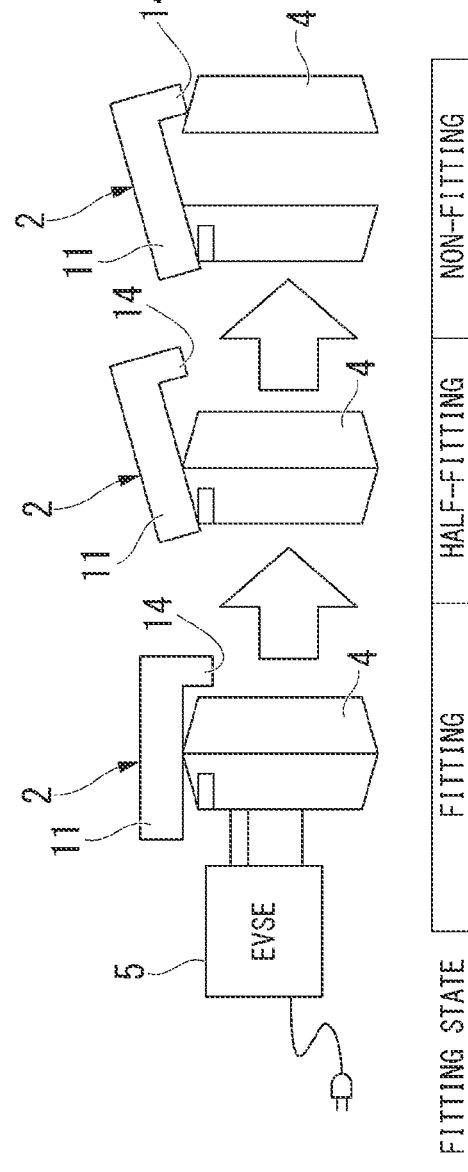
FIG. 3 is an explanatory diagram of a change in the fitting state when the charging gun of the embodiment is removed from the inlet.

As illustrated in FIG. 3, the fitting state when the charging gun 2 is removed from the inlet 4 changes in the order of "fitted", "half-fitted", and "non-fitted". For example, the user can raise the engagement protrusion 14 and pull out the charging gun 2 from the inlet 4 by pressing the S3 switch 11 when detaching the charging gun 2 from the inlet 4. A configuration may be adopted in which when the user removes the charging gun 2 from the inlet 4, the engagement protrusion 14 is not raised and the charging gun 2 cannot be pulled out from the inlet 4 unless the S3 switch 11 is pressed.

<Fitting Detection Circuit>

Figure 4:
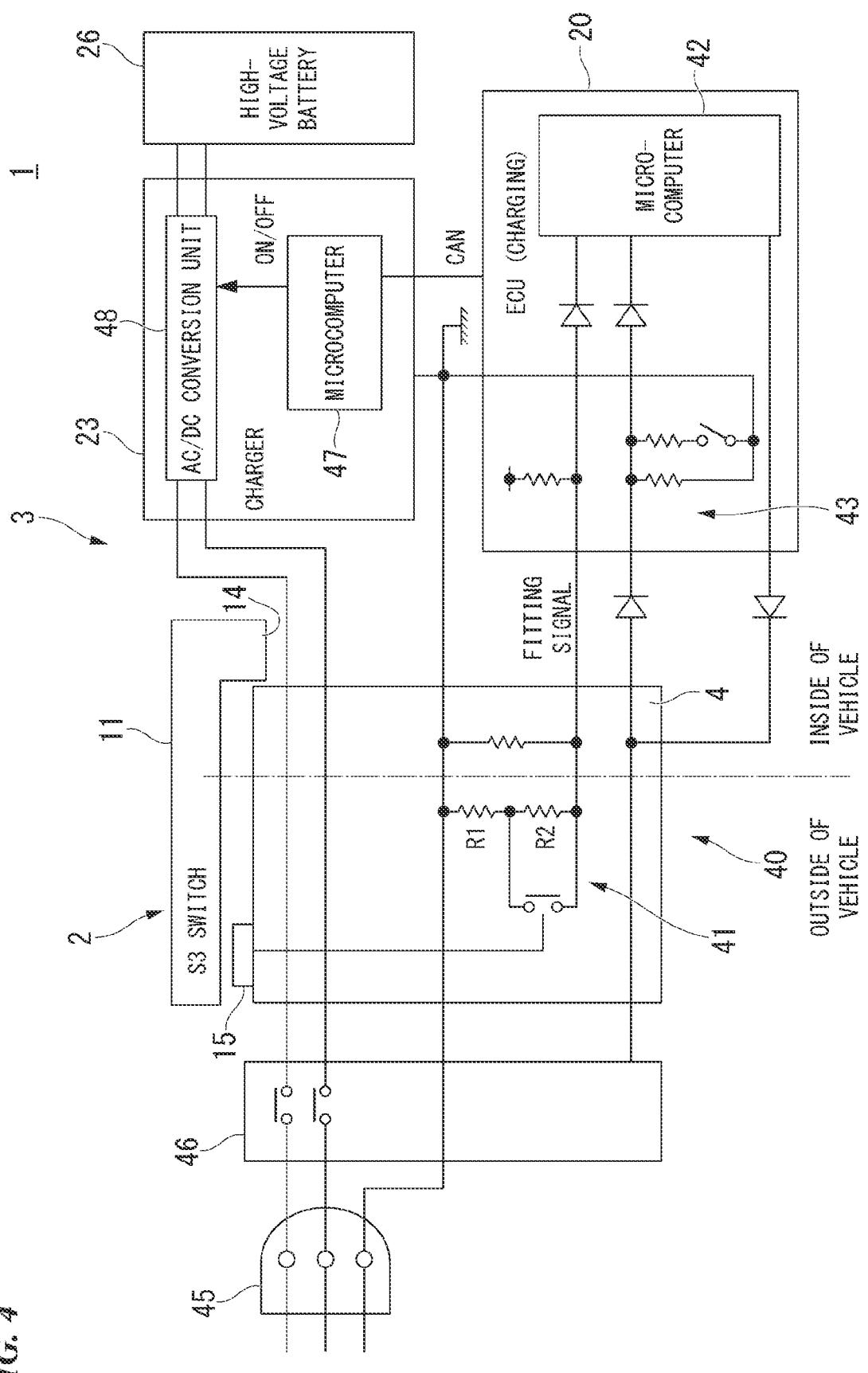
FIG. 4 is a diagram illustrating an example of a fitting detection circuit of the embodiment.

As illustrated in FIG. 4, the charging control system 1 includes a fitting detection circuit 40 for detecting a fitting state of the charging gun 2. The fitting detection circuit 40 includes a resistance voltage divider circuit 41 (circuit including resistors R1 and R2) connected to a contact 15 with which the S3 switch 11 of the charging gun 2 is in contact, an ECU circuit 43 connected to a microcomputer 42 of the charging control ECU 20, and the like.

The charging control ECU 20 can detect fitting and half-fitting as the connection state of the charging gun 2 with respect to the inlet 4. The charging gun 2 can be half-fitted by pressing the S3 switch 11 (an example of a predetermined operation). In FIG. 4, a reference numeral 45 denotes a power supply plug, a reference numeral 46 denotes a charging facility, a reference numeral 47 denotes a microcomputer of the charger 23, and a reference numeral 48 denotes an AC/DC converter of the charger 23.

The charging control ECU 20 detects "non-fitting", "fitting", and "half-fitting" as in (1) to (3) below.

(1) When no voltage is applied to ECU circuit 43, "non-fitting" is detected.

(2) When the charging gun 2 is connected to the inlet 4, a voltage is applied to the ECU circuit 43, and "fitting" is detected.

(3) When the S3 switch 11 is pressed in the state (2), the voltage dividing resistance on the charging gun 2 side changes, and "half-fitting" is detected.

When the S3 switch 11 of the charging gun 2 is pressed, the S3 switch 11 comes into contact with the contact 15. As a result, the voltage is divided by the resistors R1 and R2 of the resistance voltage divider circuit 41. Then, the voltage value on the vehicle side changes. The charging control ECU 20 reads the changed voltage value on the vehicle side as a fitting signal. For example, the fitting signal is a voltage signal of 0 to 5 V. The charging control ECU 20 detects "half-fitting" when the voltage value (fitting signal) changes with respect to a reference voltage (for example, a voltage at the time of fitting). For example, "half-fitting" can be detected as a user's operation, and can be regarded as an intention to immediately charge.

As described above, when the charging gun 2 is connected to the inlet 4, even if the S3 switch 11 is not pressed, the engagement protrusion 14 is lifted by pushing the charging gun 2 toward the inlet 4, so that the S3 switch 11 comes into contact with the contact 15. Therefore, when the S3 switch 11 is normal, the charging control ECU 20 detects "non-fitting", "half-fitting", and "fitting" in this order when the charging gun 2 is connected to the inlet 4. In contrast, when the S3 switch 11 is abnormal (for example, in the case of off-fixing), the charging control ECU 20 detects "non-fitting" and "fitting" in this order when the charging gun 2 is connected to the inlet 4.

<Charging Gun>

Figure 5:
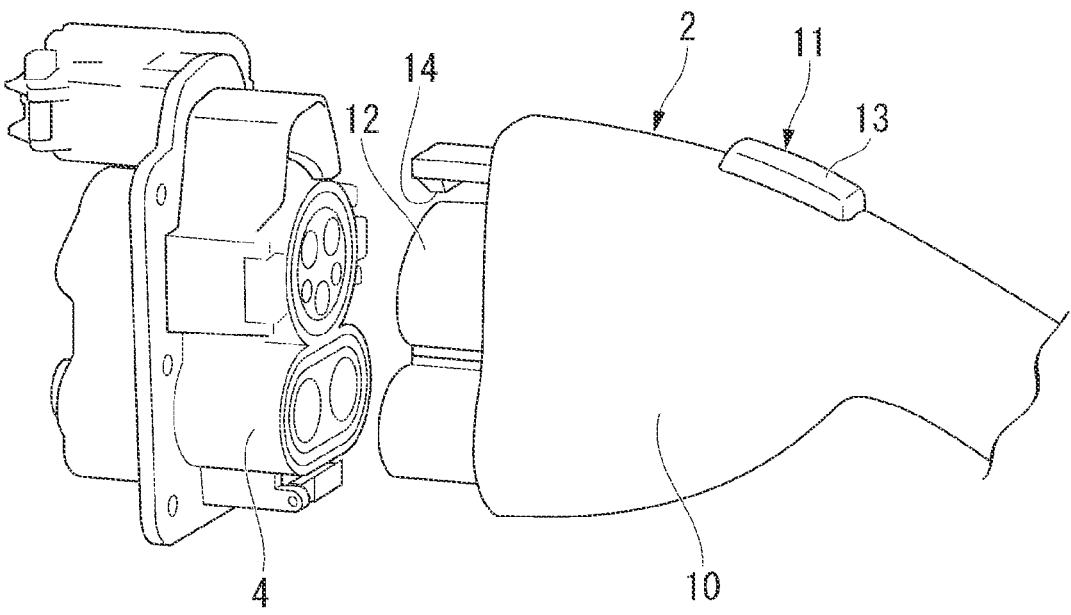
FIG. 5 is a perspective view of the charging gun and the inlet of the embodiment.

As illustrated in FIG. 5, the charging gun 2 is a gun-type charger provided on the facility side. The charging gun 2 is configured to be insertable into and removable from the inlet 4 on the vehicle side. The charging gun 2 includes a gun main body 10, the S3 switch 11 operable by the user, and a plug 12 connectable to the inlet 4.

The S3 switch 11 is provided on an upper portion of the gun main body 10. The S3 switch 11 includes an operation protrusion 13 protruding from the gun main body 10 so as to be operable by the user, and the engagement protrusion 14 which can be engaged with the inlet 4. For example, the user can operate the S3 switch 11 while gripping the gun main body 10 with one hand.

The plug 12 protrudes from the gun main body 10 toward the inlet 4. For example, the user can push the plug 12 toward the inlet 4 while gripping the gun main body 10.

<Lock Mechanism>

Figure 6:
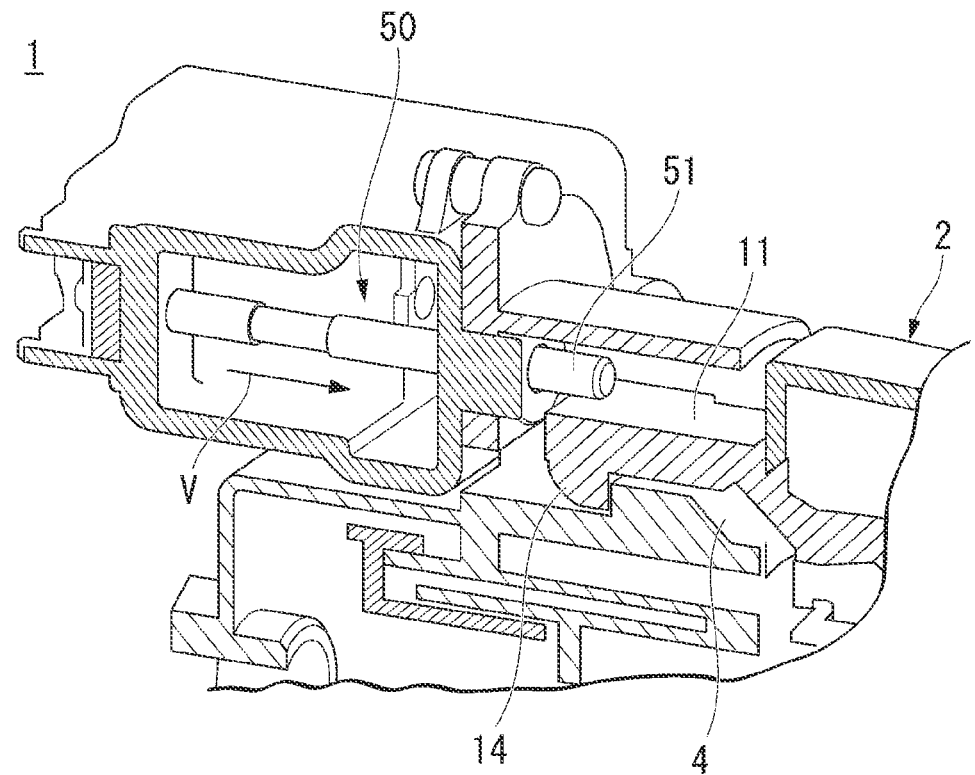
FIG. 6 is a perspective view including a cross-section of a lock mechanism, the charging gun, and the inlet of the embodiment.

As illustrated in FIG. 6, the charging control system 1 includes the lock mechanism 50 that locks the charging gun 2 and the inlet 4. The lock mechanism 50 includes a lock pin 51 provided on the vehicle side. For example, the lock pin 51 can be taken in and out (movable in a direction of an arrow V in FIG. 6 and a direction opposite to the direction of the arrow V) by an operation on the vehicle side.

In the state of FIG. 6, the lock pin 51 protrudes from the vehicle side toward the charging gun 2 side. For example, when the lock pin 51 protrudes toward the charging gun 2 side in a state where the engagement protrusion 14 of the S3 switch 11 is engaged with the inlet 4, the S3 switch 11 is restrained by the lock pin 51. That is, the charging gun 2 is locked to the inlet 4. This makes it possible to prevent the charging gun 2 from being pulled out during energization.

<Unlock Switch>

Figure 7:
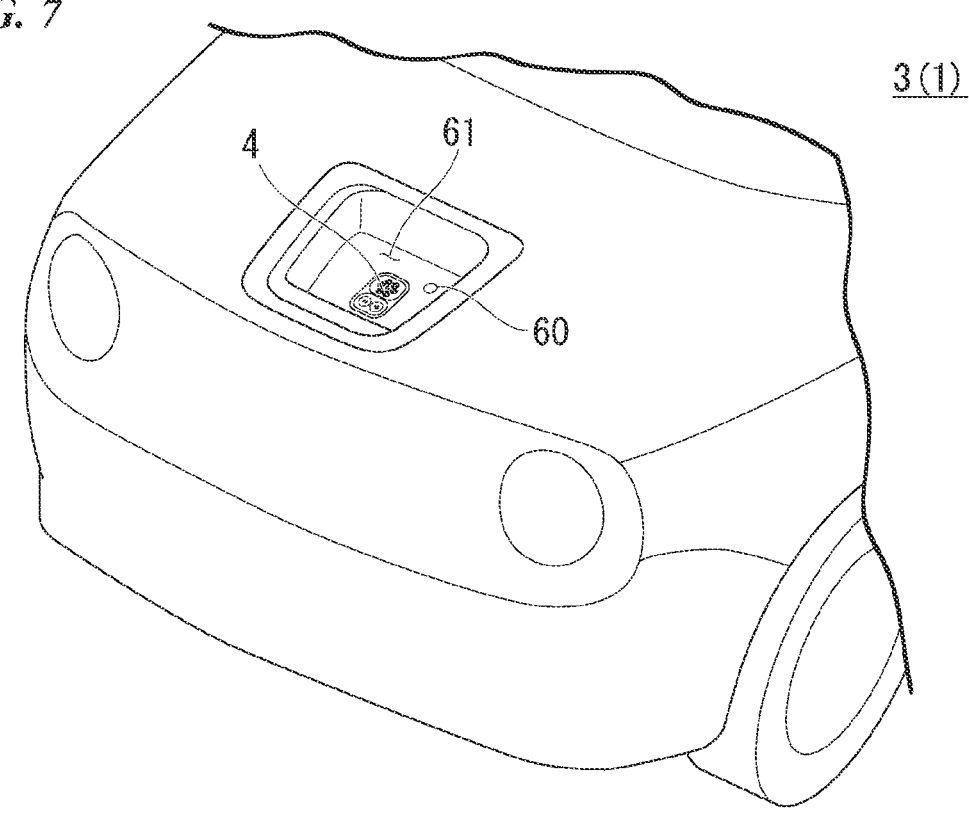
FIG. 7 is a perspective view of a front portion of an electric vehicle of the embodiment.

As illustrated in FIG. 7, the charging control system 1 includes an unlock switch 60 for releasing the lock between the charging gun 2 and the inlet 4. The unlock switch 60 is provided at a front portion of the electric vehicle 3. In the example of FIG. 7, the front portion of the electric vehicle 3 has a recess 61 recessed downward. The inlet 4 and the unlock switch 60 are provided on the bottom surface side of the recess 61. For example, a lid member (for example, an openable/closable lid) that covers the recess 61 may be provided at the front portion of the electric vehicle 3.

Figure 8:
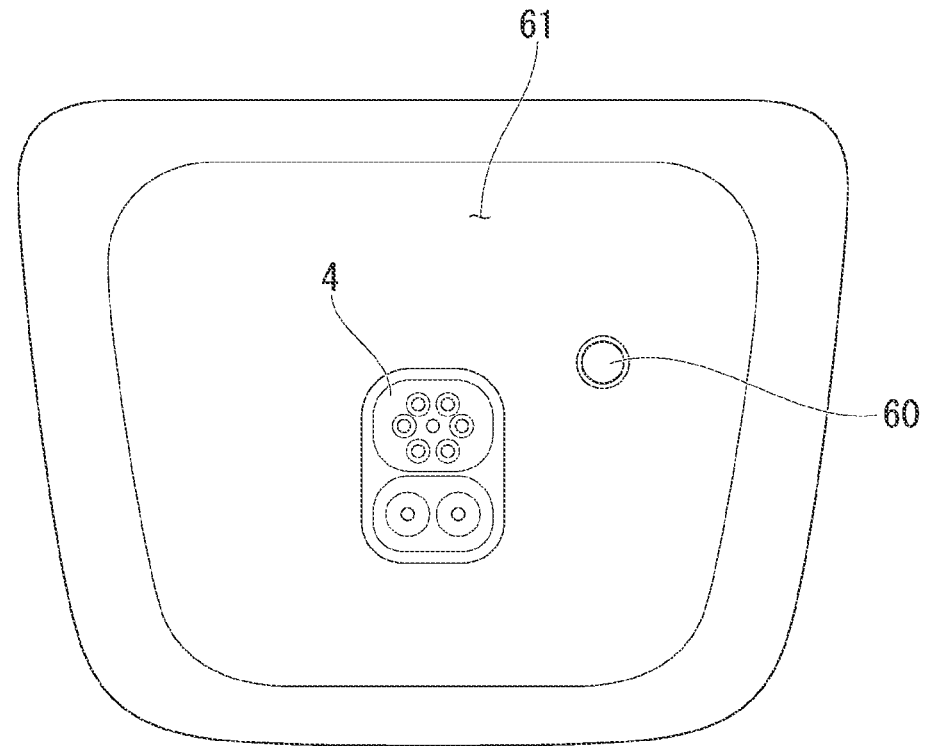
FIG. 8 is a top view of the inlet and an unlock switch of the embodiment.

As illustrated in FIG. 8, the inlet 4 is disposed at the center of the bottom surface of the recess 61 in top view. The unlock switch 60 is disposed on the side (right side in the drawing) of the inlet 4 in top view. For example, the unlock switch 60 may be configured to be operable by a smart key. For example, from the viewpoint of anti-theft properties, the unlock switch 60 may be configured to be operable only by the owner of the electric vehicle 3 (the owner of the key).

For example, when the unlock switch 60 is pressed, the lock pin 51 moves in the direction opposite to the direction of the arrow V from the state of FIG. 6, and enters the vehicle side (stops protruding toward the charging gun 2 side). When the lock pin 51 enters the vehicle side, the S3 switch 11 is released from the restraint by the lock pin 51. That is, the lock between the charging gun 2 and the inlet 4 is released. As a result, the charging gun 2 can be pulled out.

<Switch Operation during Insertion and Removal of Charging Gun>

Hereinafter, examples (first example to fourth example) of the switch operation at the time of insertion and removal of the charging gun 2 will be described with reference to FIGS. 9 to 12. In each drawing, time is indicated in the horizontal direction, and a vehicle state, an SOC, a fitting state, an activation factor, a charging state, a lock state, and a charging indicator are indicated in the vertical direction.

The vehicle state indicates one of a state in which charging is performed (charging performed), an activated state (activation), and a non-activated state (sleep). The SOC indicates a charge level with respect to a full charge threshold. The fitting state is a fitting state when the charging gun 2 is inserted into and removed from the inlet 4, and indicates one of "non-fitting", "half-fitting", and "fitting". The activation factor is an activation factor from the charging facility, and is, for example, a charging start request by fitting of the charging gun 2. Alternatively, a control pilot (CPLT) signal from the charging facility may be used as the activation factor. The lock state is a lock state of the charging gun 2 and the inlet 4, and indicates whether the charging gun 2 and the inlet 4 are locked (locked) or not (unlocked). The charging indicator is provided, for example, on a display device on the vehicle side so as to be visually recognizable by an occupant, and indicates any one of "off", "blinking", and "on".

<Timer Charging Cancellation>

Figure 9:
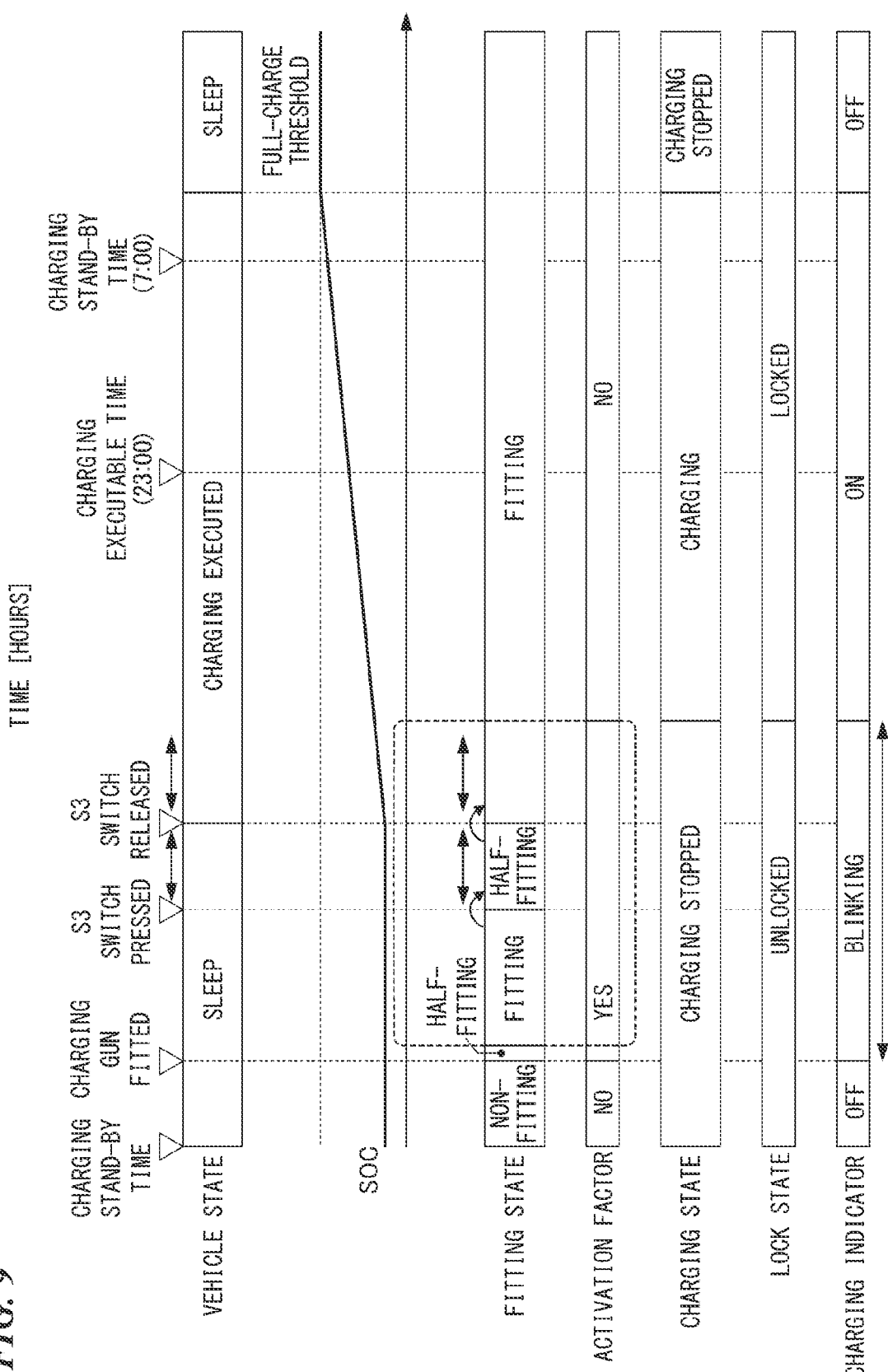
FIG. 9 is an explanatory diagram of a first example of a switch operation at the time of insertion and removal of the charging gun of the embodiment.

FIG. 9 illustrates an example of canceling timer charging in a state where a timer charging reservation (example of timer charging setting and schedule setting) in the charging execution time period is performed. FIG. 9 is an example in which the user fits the charging gun 2 without pressing the S3 switch 11 and cancels the timer charging by a predetermined operation of the S3 switch 11.

For example, after fitting the charging gun 2 without pressing the S3 switch 11, the user presses the S3 switch 11 for a predetermined period or longer (an example of a predetermined operation). For example, after fitting the charging gun 2 without pressing the S3 switch 11, the user presses the S3 switch 11 for a predetermined period or longer, and then releases the S3 switch 11 for a predetermined period or longer. For example, the user presses the S3 switch 11 again while the charging indicator is blinking.

For example, the charging control ECU 20 cancels the timer charging in a case where, after fitting is detected as the fitting state, half-fitting is detected, and then fitting is detected. For example, the charging control ECU 20 cancels the timer charging in a case where a change in the fitting signal described below is detected within a certain period after activation by the charging facility. For example, the charging control ECU cancels the timer charging in a case where "fitting" →"half-fitting continues for a certain period (for example, 1 second to 3 seconds)" →"fitting continues for a certain period" is detected as the change in the fitting signal.

For example, the charging control ECU 20 cancels the timer charging in a case where, after the S3 switch 11 is pressed for a certain period or longer (example of a second period or longer) within a certain period (example of within a first period) after the fitting of the charging gun 2, a state in which the S3 switch 11 is not pressed has continued for a certain period or longer (example of a third period or longer. For example, the charging control ECU 20 starts charging the vehicle after cancelling the timer charging.

Figure 10:
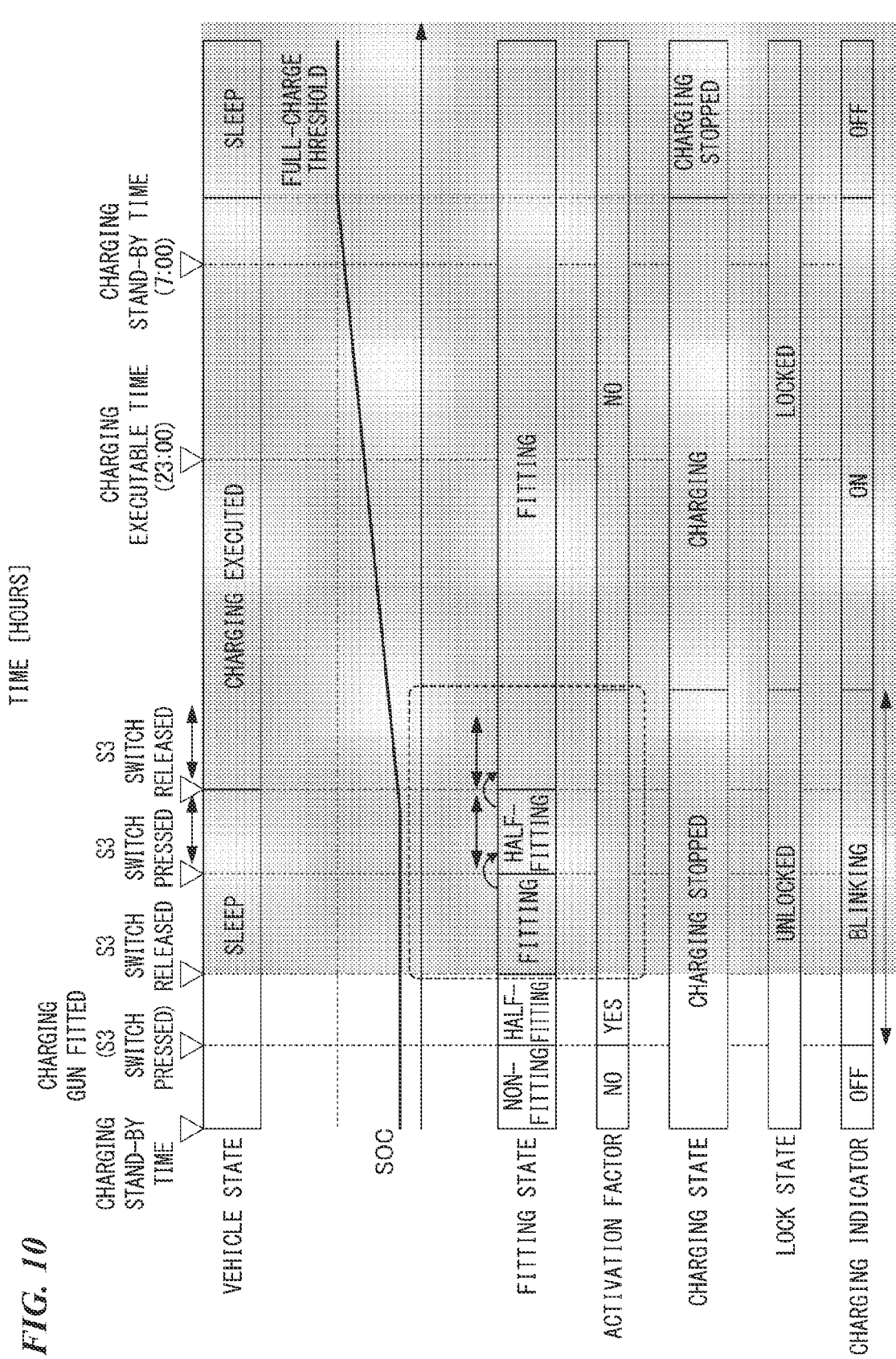
FIG. 10 is an explanatory diagram of a second example of the switch operation at the time of insertion and removal of the charging gun of the embodiment.

FIG. 10 illustrates an example in which the timer charging is cancelled in a state in which the timer charging is set. FIG. 10 is an example in which the user fits the charging gun 2 while pressing the S3 switch 11, and cancels the timer charging by a predetermined operation of the S3 switch 11. In FIG. 10, portions of operations similar to those in FIG. 9 are indicated by dot hatching, and detailed description thereof will be omitted.

For example, after fitting the charging gun 2 while pressing the S3 switch 11, the user releases the S3 switch 11, presses the S3 switch 11 again, and releases the S3 switch 11 again. For example, the charging control ECU 20 cancels the timer charging in a case where a state in which the S3 switch 11 is not pressed is continued for a certain period or longer within a certain period from the fitting of the charging gun 2 while the S3 switch 11 is pressed, and then the state in which the S3 switch 11 is not pressed is continued for a certain period or longer after the S3 switch 11 is pressed again for a certain period or longer.

<Example of User's Erroneous Operation>

Figure 11:
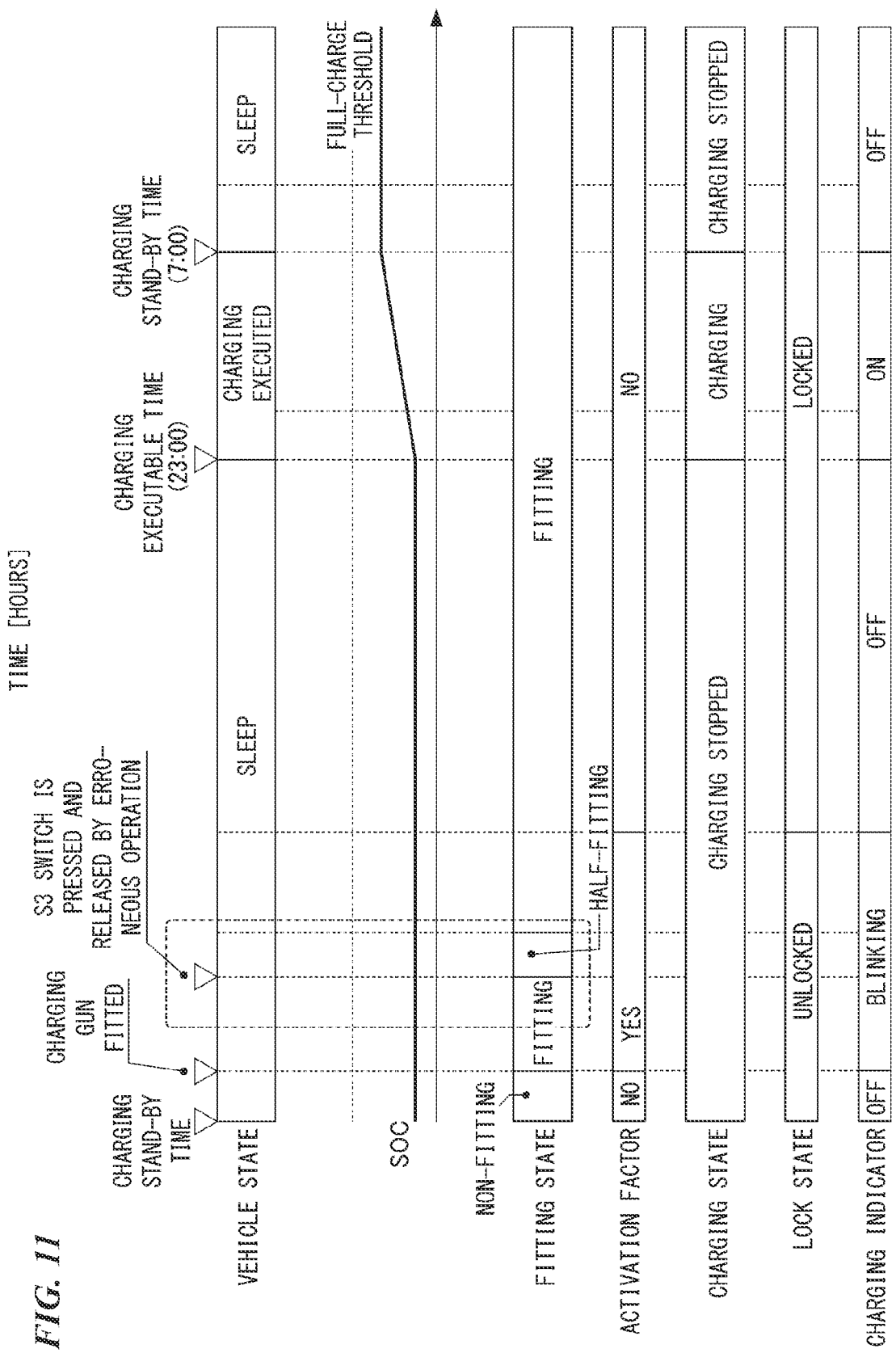
FIG. 11 is an explanatory diagram of a third example of the switch operation at the time of insertion and removal of the charging gun of the embodiment.

FIG. 11 illustrates an example in which, after the charging gun 2 is fitted, the user presses the S3 switch 11 for a moment due to an erroneous operation and thus opens the S3 switch 11 again.

For example, the charging control ECU 20 sets an S3 switch pressing confirmation time as a necessary condition for determining timer charging cancellation when the user presses the S3 switch 11. According to this setting, even when the user presses the S3 switch 11 by an erroneous operation after the charging gun 2 is fitted, the cancellation of the timer charging is not erroneously determined.

Figure 12:
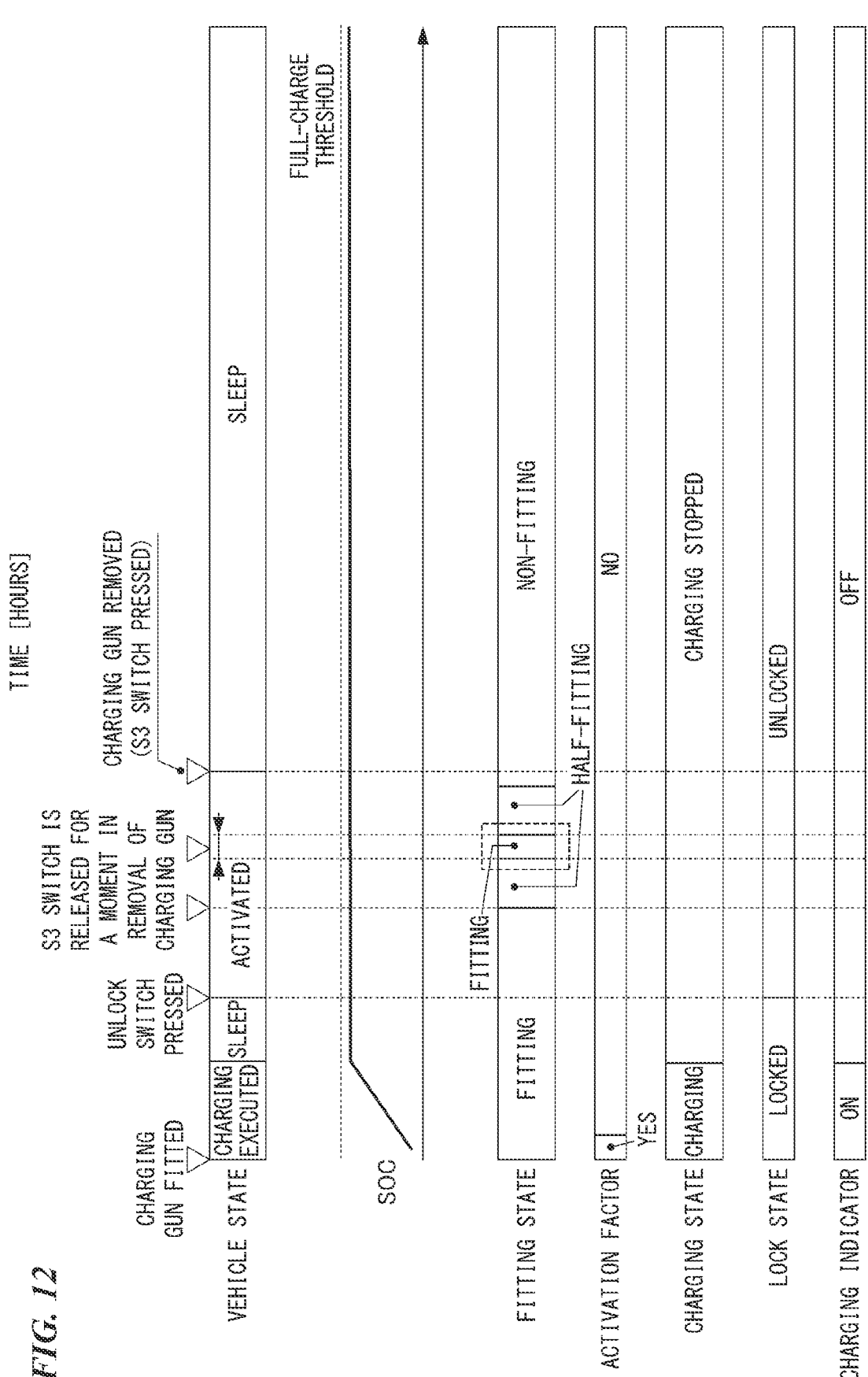
FIG. 12 is an explanatory diagram of a fourth example of the switch operation at the time of insertion and removal of the charging gun of the embodiment.

FIG. 12 is an example in which, at the time of removing the charging gun 2, the user releases the S3 switch 11 for a moment due to an erroneous operation and then presses the S3 switch 11 again.

For example, the charging control ECU 20 sets an S3 switch release confirmation time as a necessary condition for determining timer charging cancellation when the user releases the S3 switch 11. Even when the user releases the S3 switch 11 for a moment due to an erroneous operation and then presses the S3 switch again at the time of removing the charging gun 2, the charging control ECU 20 does not erroneously determine the cancellation of the timer charging.

<Example of Activation Factor from Charging Facility>

Figure 13:
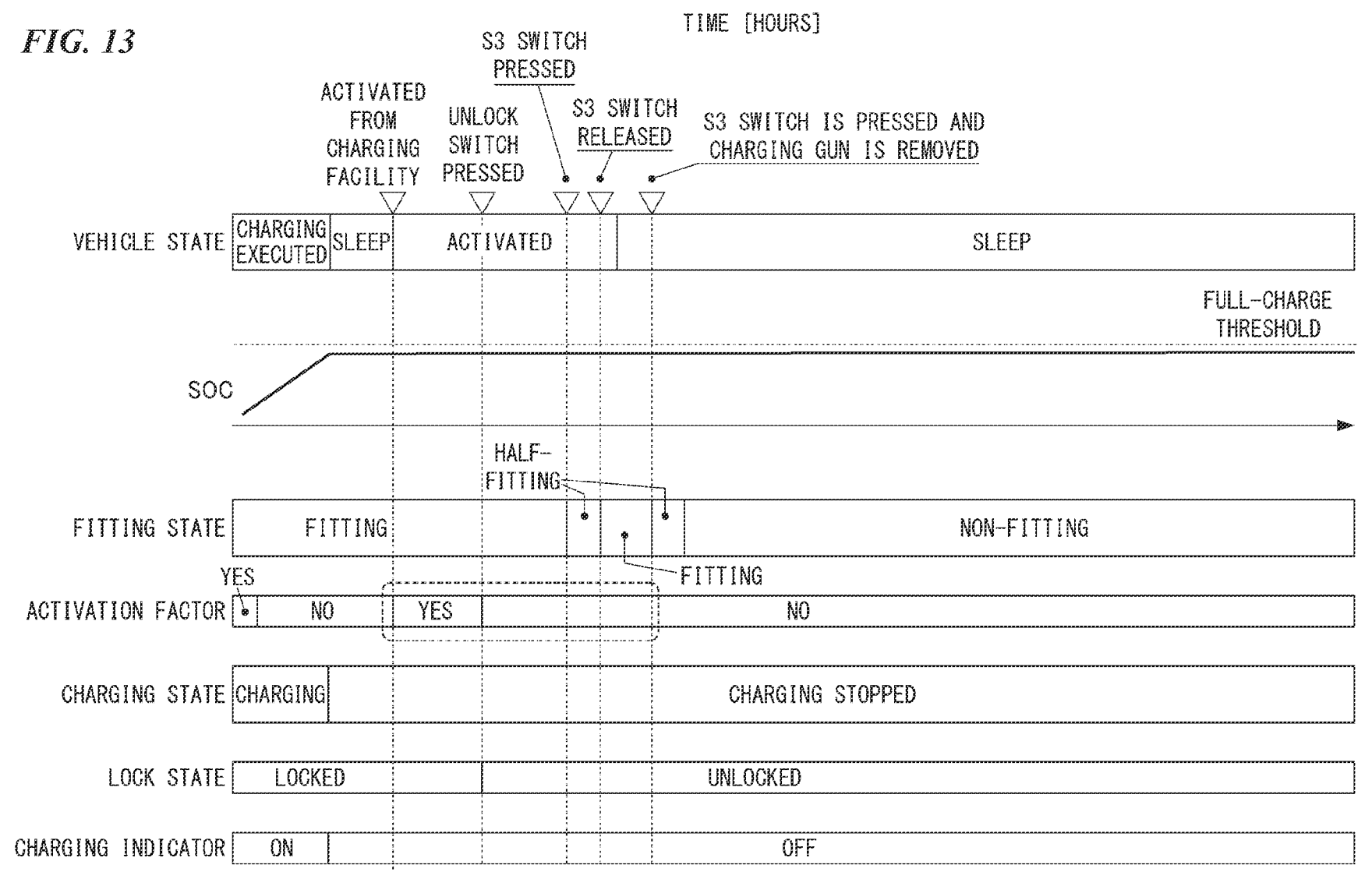

FIG. 13 illustrates an example in which, after the lock of the charging gun 2 is released and immediately before the user removes the charging gun 2 while pressing the S3 switch 11, a timer charging start time on the charging facility side happens to be reached. In FIG. 13, time is indicated in the horizontal direction, and a vehicle state, an SOC, a fitting state, an activation factor, a charging state, a lock state, and a charging indicator are indicated in the vertical direction.

For example, when detecting the unlock operation, the charging control ECU 20 resets a reception period of timer charging cancellation (for example, a certain period after the activation factor from the charging facility is detected) in a case where the unlock operation is detected. For example, the charging control ECU 20 does not cancel the timer charging even if the user erroneously operates the S3 switch 11 unless the charging gun 2 is inserted and removed again.

Even when the activation factor (for example, a charging start request by the CPLT signal) from the charging facility side happen to overlap in a state before the removal operation of the charging gun 2, the charging control ECU 20 does not determine the cancellation of the timer charging due to an erroneous operation by the user (for example, press S3 switch 11→release S3 switch 11→press S3 switch 11).

<Example of When S3 Switch Malfunctions>

Figure 14:
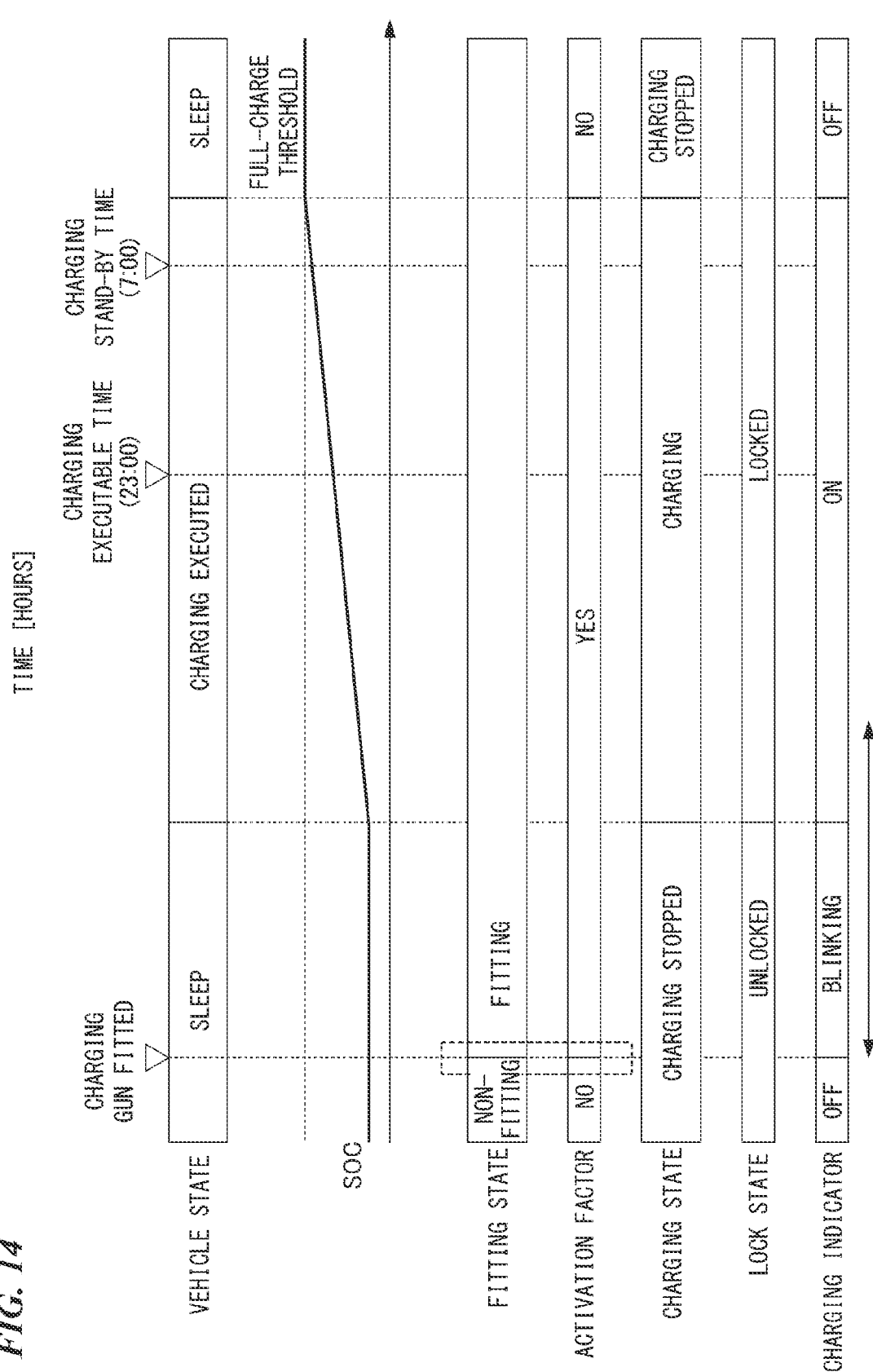
FIG. 14 is an explanatory diagram of an example of automatically canceling timer charging when a switch of the charging gun of the embodiment is out of order.

FIG. 14 is an example of automatically canceling timer charging when S3 switch 11 malfunctions. In FIG. 14, time is indicated in the horizontal direction, and a vehicle state, an SOC, a fitting state, an activation factor, a charging state, a lock state, and a charging indicator are indicated in the vertical direction.

For example, when the S3 switch 11 is out of order, the S3 switch 11 is fixed to an off state due to the malfunction. Due to the off fixation of the S3 switch 11, the charging control ECU 20 cannot detect the timer charging cancellation operation by the user.

For example, the charging control ECU 20 determines an abnormality when the fitting state is changed from the non-fitting to the fitting without detecting the half-fitting. The charging control ECU 20 functions as a determination unit that determines an abnormality related to the detection of the fitting state. When the abnormality is determined, the charging control ECU 20 cancels the timer charging.

<Example of Processing after Half-Fitting is Detected when Charging Gun is Connected>

Figure 15:
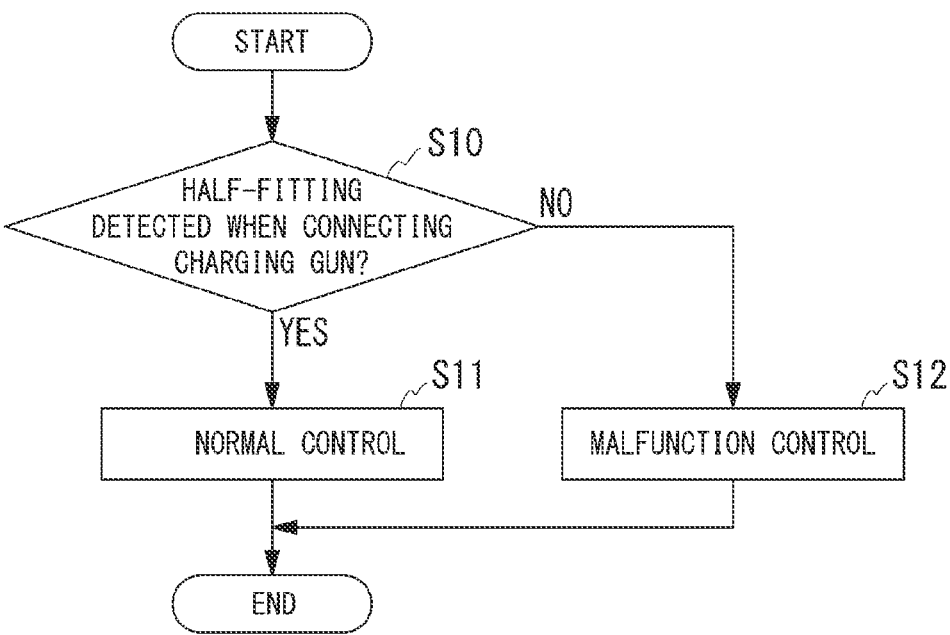
FIG. 15 is a flowchart illustrating an example of processing after half-fitting is detected at the time of connecting the charging gun the embodiment.

FIG. 15 is a flowchart illustrating an example of processing after the half-fitting is detected at the time of connecting the charging gun 2.

As illustrated in FIG. 15, in step S10, the charging control ECU 20 determines whether or not the half-fitting has been detected at the time of connecting the charging gun 2. For example, the charging control ECU 20 determines that "half-fitting" is detected when the voltage value (fitting signal) changes with respect to a reference voltage (for example, a voltage at the time of fitting) at the time of connecting the charging gun 2. When it is determined that the half-fitting has been detected at the time of connecting the charging gun 2 (YES in step S10), the process proceeds to step S11. In contrast, when it is determined that the half-fitting has not been detected at the time of connecting the charging gun 2 (NO in step S10), the process proceeds to step S12.

In step S11, the charging control ECU 20 performs normal control. An example of the normal control will be described with reference to FIG. 16.

In step S12, the charging control ECU 20 performs malfunction control. For example, the malfunction control displays a warning to the user that the S3 switch 11 is malfunctioning. For example, the warning may be displayed on a display device visible to the occupant, or may be notified by voice or a warning sound. For example, the malfunction control may automatically cancel the timer charging and immediately start charging.

<Example of Normal Control after Detection of Half-Fitting when Connecting Charging Gun>

Figure 16:
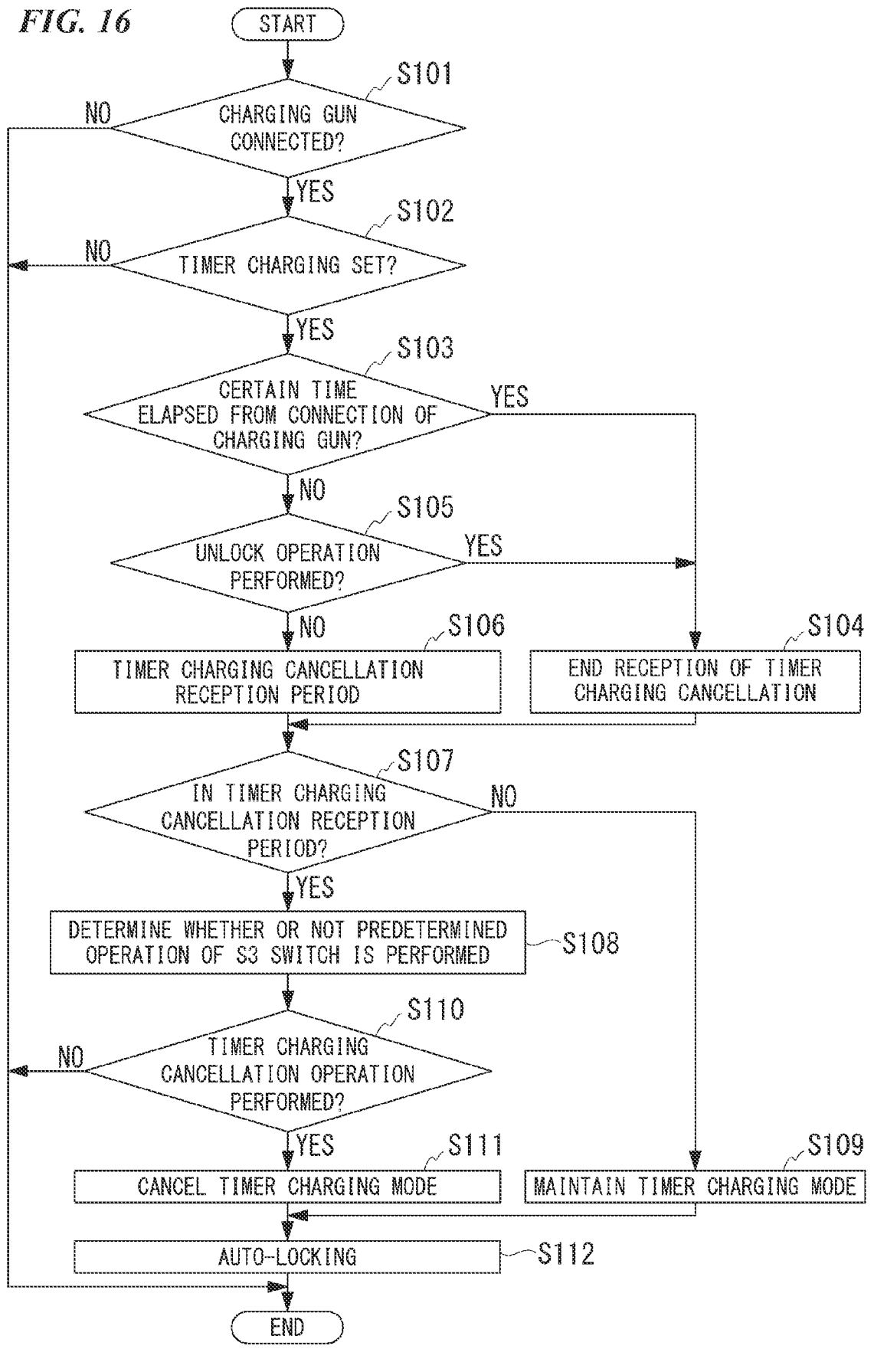
FIG. 16 is a flowchart illustrating an example of normal control after half-fitting is detected at the time of connecting the charging gun of the embodiment.

FIG. 16 is a flowchart illustrating an example of normal control after half-fitting is detected at the time of connecting the charging gun 2.

As illustrated in FIG. 16, in step S101, the charging control ECU 20 determines whether or not the charging gun 2 is connected. For example, in a case where "fitting" is detected as the connection state of the charging gun 2 with respect to the inlet 4, the charging control ECU 20 determines that the charging gun 2 is connected. In contrast, in a case where "non-fitting" is detected as the connection state of the charging gun 2 with respect to the inlet 4, the charging control ECU 20 determines that the charging gun 2 is not connected. When it is determined that the charging gun 2 is connected (YES in step S101), the process proceeds to step S102. In contrast, when it is determined that the charging gun 2 is not connected (NO in step S101), the process ends.

In step S102, the charging control ECU 20 determines whether or not the timer charging is set. For example, the charging control ECU 20 determines whether or not the timer charging is set, on the basis of a state of a flag that is turned on when the timer charging is set by a user operating a timer switch or the like. When it is determined that timer charging is set (YES in step S102), the process proceeds to step S103. In contrast, when it is determined that the timer charging is not set (NO in step S102), the process ends.

In step S103, the charging control ECU 20 determines whether or not a certain time has elapsed from the connection of the charging gun 2. For example, the certain period from the connection of the charging gun 2 is a predetermined period (for example, a predetermined period of about 10 seconds) from the time when "fitting" is detected as the connection state of the charging gun 2 with respect to the inlet 4. For example, the certain period from the connection of the charging gun 2 may be set to a predetermined period from the time when the activation factor (CPLT signal) from the charging facility is detected. When it is determined that the certain period has elapsed from the connection of the charging gun 2 (YES in step S103), the process proceeds to step S104. In contrast, when it is determined that the certain period has not elapsed from the connection of the charging gun 2 (NO in step S103), the process proceeds to step S105.

In step S104, the charging control ECU 20 determines that a reception period for the timer charging cancellation has ended. After step S104, the process proceeds to step S107.

In step S105, the charging control ECU 20 determines whether or not there the unlock operation has been performed. For example, when the unlock switch 60 is pressed, the charging control ECU 20 determines that the unlock operation has been performed. In contrast, when the unlock switch 60 is not pressed, the charging control ECU 20 determines that the unlock operation has not been performed. When it is determined that the unlock operation has been performed (YES in step S105), the process proceeds to step S104. In contrast, when it is determined that the unlock operation has not been performed (NO in step S105), the process proceeds to step S106.

In step S106, the charging control ECU 20 sets a reception period for the timer charging cancellation. After step S106, the process proceeds to step S107.

In step S107, the charging control ECU 20 determines whether or not the current time is within a reception period for the timer charging cancellation. For example, the reception period for the timer charging cancellation is a period in which a time point when a time A has elapsed from a time point when "fitting" is detected as the connection state of the plug 12 of the charging gun 2 with respect to the inlet 4 is set as a start point, and a time point after the elapse of a time B from the time point when the time A has elapsed is set as an end point. For example, the reception period for the timer charging cancellation is a predetermined period of about 10 seconds. When it is determined that the current time is within the reception period for the timer charging cancellation (YES in step S107), the process proceeds to step S108. In contrast, when it is determined that the current time is not within the reception period for the timer charging cancellation (NO in step S107), the process proceeds to step S109.

In step S108, the charging control ECU 20 determines whether or not a predetermined operation of the S3 switch 11 has been performed. The predetermined operation of the S3 switch 11 will be described with reference to FIG. 17 and the like. After step S108, the process proceeds to step S110.

In step S109, the charging control ECU 20 maintains a timer charging mode. After step S109, the process proceeds to step S112.

In step S110, the charging control ECU 20 determines whether or not a timer charging cancellation operation has been performed. For example, when the predetermined operation of the S3 switch 11 is performed by the user in a state where the timer charging is set, the charging control ECU 20 determines that the timer charging cancellation operation has been performed. In contrast, in a case where the predetermined operation of the S3 switch 11 is not performed by the user in a state where the timer charging is set, the charging control ECU 20 determines that the timer charging cancellation operation has not been performed. When it is determined that the timer charging cancellation operation has been performed (YES in step S110), the process proceeds to step S111. In contrast, when it is determined that the timer charging cancellation operation has not been performed. (NO in step S110), the process ends.

In step S111, the charging control ECU 20 cancels the timer charging mode. After step S111, the process proceeds to step S112.

In step S112, the charging control ECU 20 performs auto-locking. After step S112, the process ends.

<Example of Predetermined Operation on S3 Switch>

Figure 18:
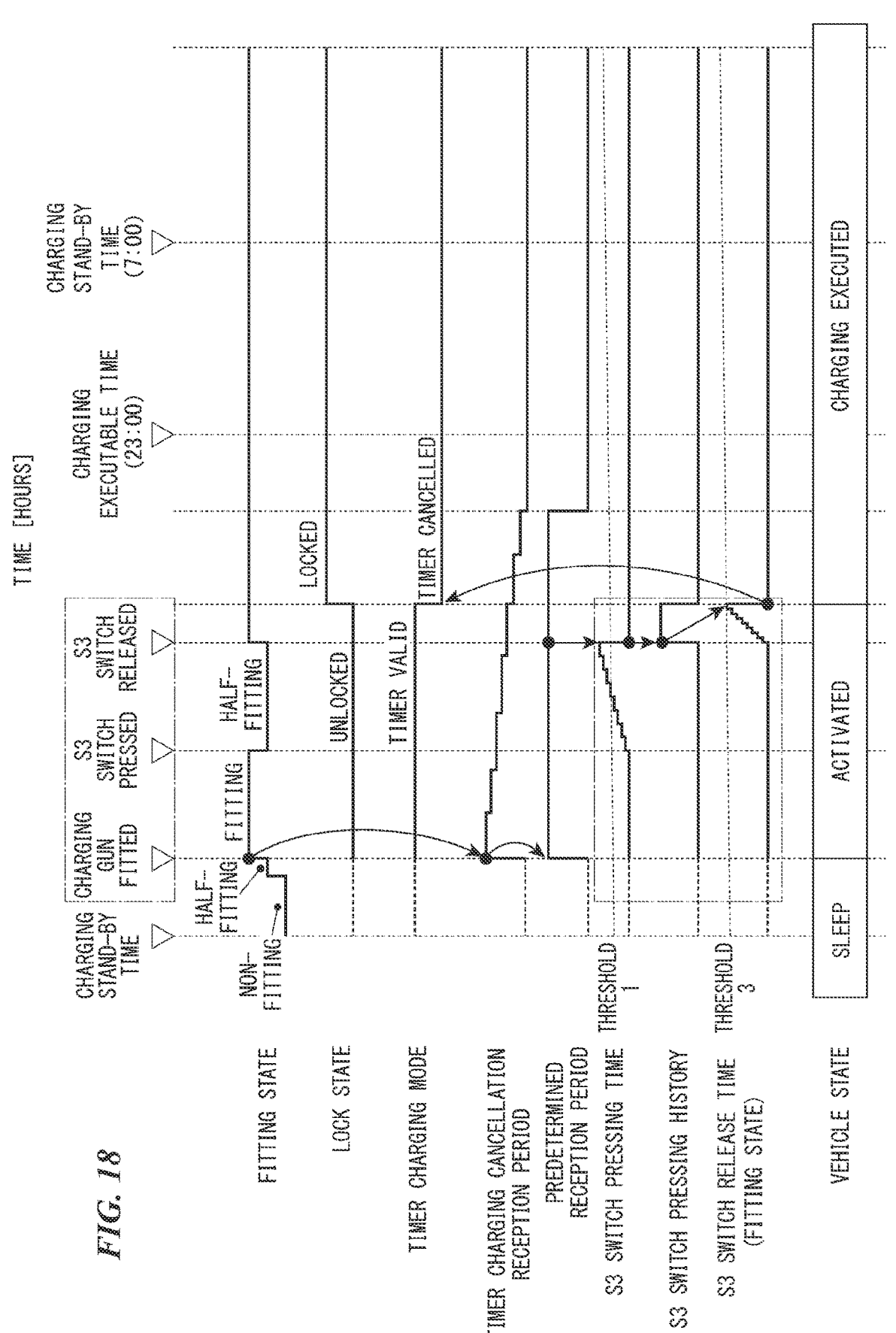
FIG. 18 is an explanatory diagram of a second example of a predetermined operation on the switch of the charging gun of the embodiment.
Figure 19:
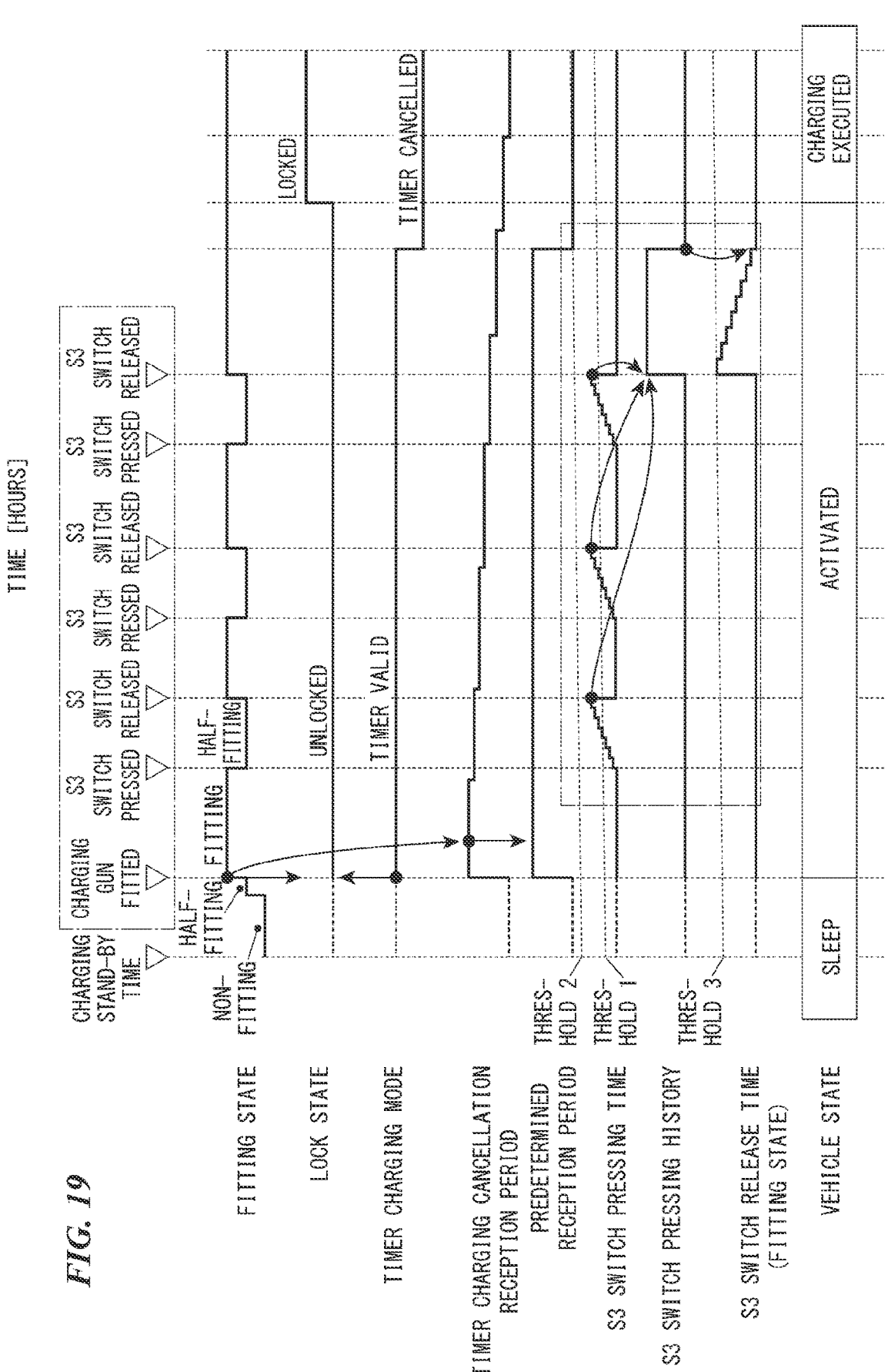
FIG. 19 is an explanatory diagram of a third example of a predetermined operation on the switch of the charging gun of the embodiment.
Figure 20:
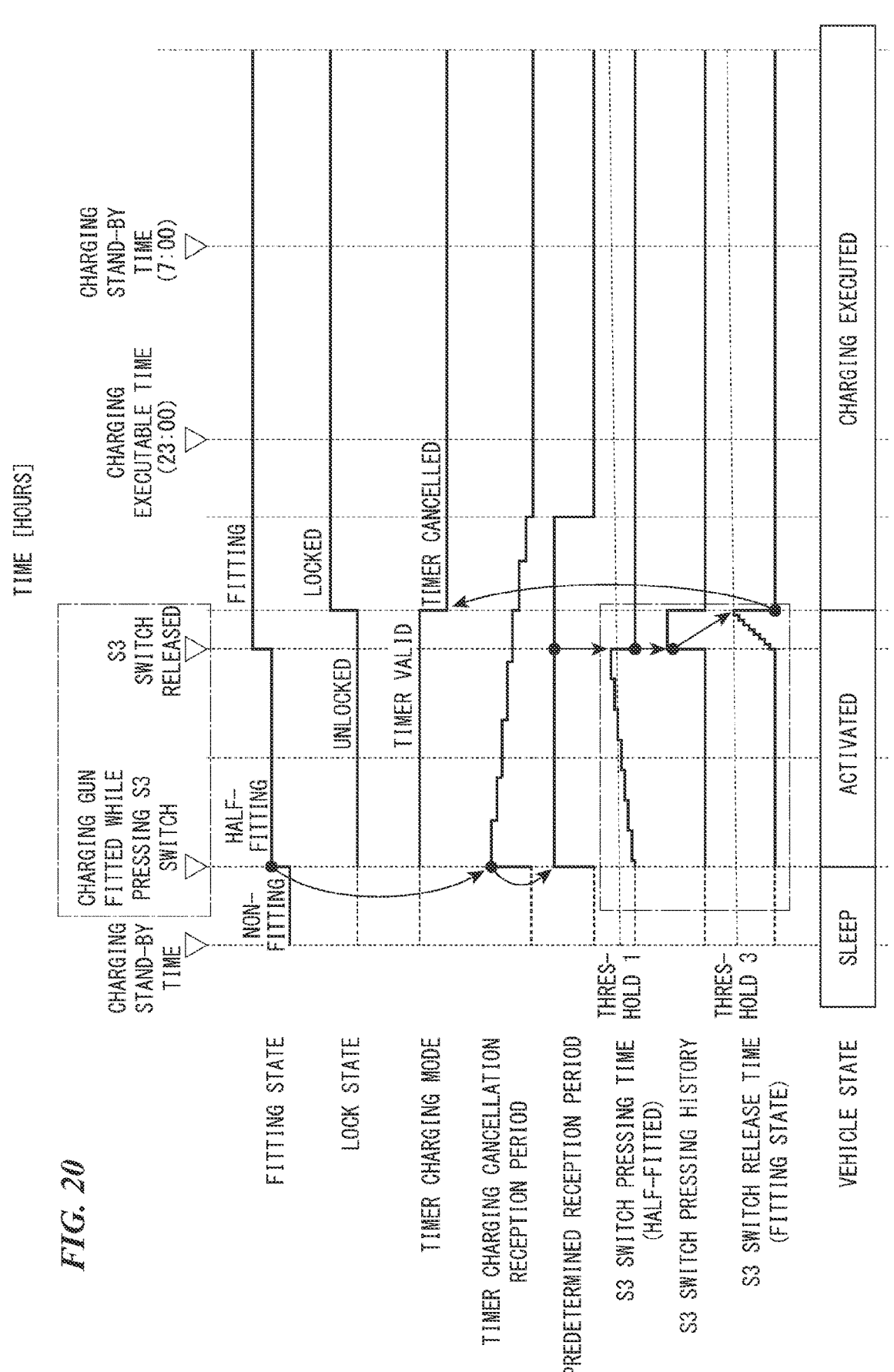
FIG. 20 is an explanatory diagram of a fourth example of a predetermined operation on the switch of the charging gun of the embodiment.

Hereinafter, examples (first example to fourth example) of the predetermined operation on the S3 switch 11 of the charging gun 2 will be described with reference to FIGS. 17 to 20. In each drawing, time is indicated in the horizontal direction, and a fitting state, a lock state, a timer charging mode, a reception period for the timer charging cancellation, a predetermined reception period, and a vehicle state are indicated in the vertical direction. In FIGS. 18 to 20, a pressing time of the S3 switch 11, a pressing history of the S3 switch 11, and a release time of the S3 switch 11 are indicated together in the vertical direction.

<Only Fitting of Charging Gun (Timer Charging Enabled)>

Figure 17:
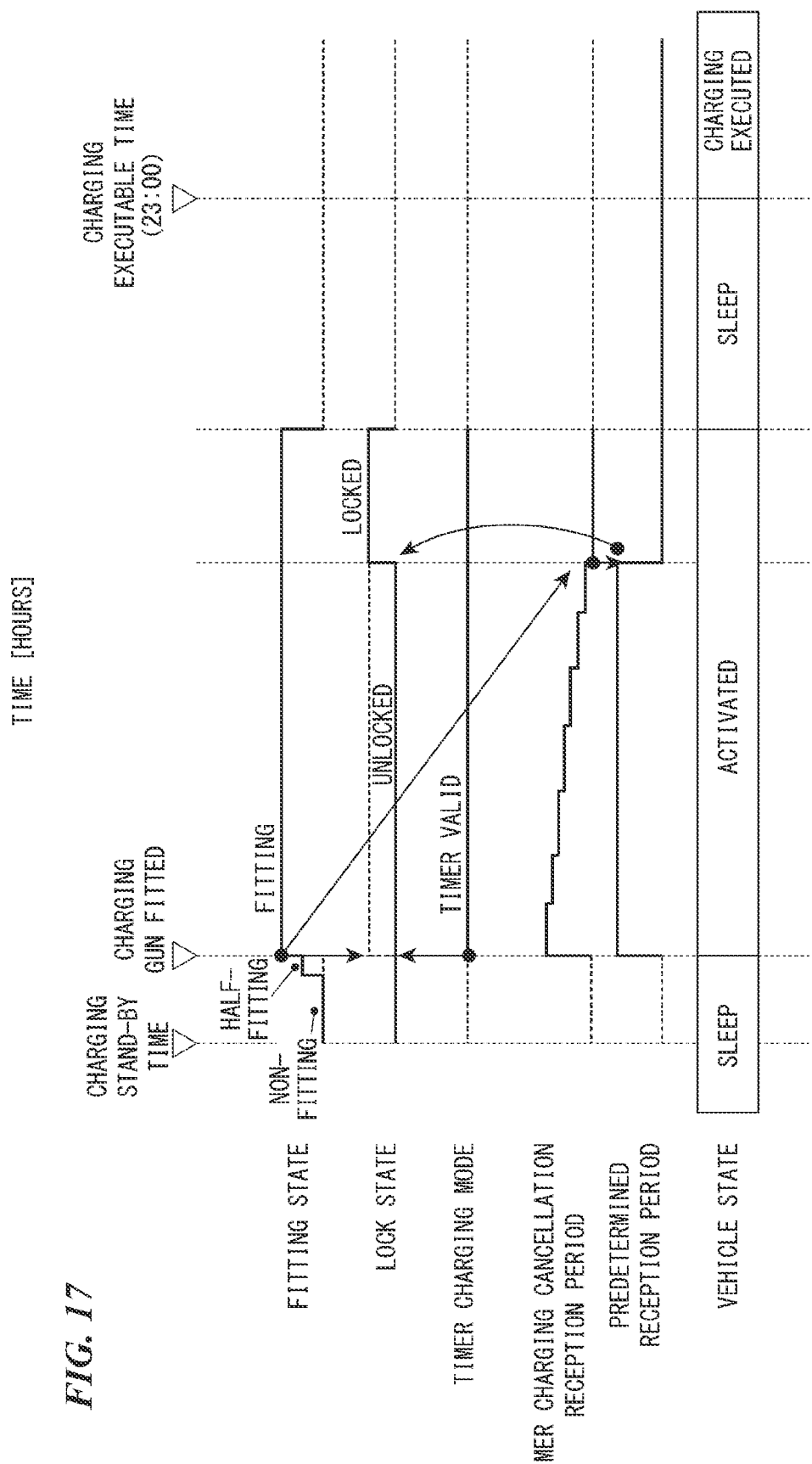
FIG. 17 is an explanatory diagram of a first example of a predetermined operation on the switch of the charging gun of the embodiment.

FIG. 17 is an example of maintaining the timer charging mode by only the fitting of the charging gun 2 (the charging gun 2 is fitted without the user pressing the S3 switch 11) (a first example of the predetermined operation on the S3 switch 11).

For example, even when only the fitting of the charging gun 2 is performed, if the S3 switch 11 is normal, the charging control ECU 20 detects the half-fitting after detecting the fitting as the fitting state, and then further detects the fitting again. Even in this case, in a case where it has been determined that the current time is not within the reception period for the timer charging cancellation, the charging control ECU 20 maintains the timer charging mode (timer charging is enabled) and performs auto-locking.

<Predetermined User Operation after Fitting of Charging Gun (Timer Charging Cancellation)>

FIG. 18 is an example in which the timer charging is cancelled by the user performing a predetermined operation (long pressing of the S3 switch 11) on the S3 switch 11 after the charging gun 2 is fitted (second example of the predetermined operation on the S3 switch 11).

For example, after fitting the charging gun 2 while pressing the S3 switch 11, the user presses the S3 switch 11 for a predetermined period or longer, and then releases the S3 switch 11 for a predetermined period or longer. For example, the charging control ECU 20 cancels the timer charging in a case where, within a certain period from the fitting of the charging gun 2 while the S3 switch 11 is pressed, a state in which the S3 switch 11 is not pressed is continued for a certain period or longer after the S3 switch 11 is pressed for a certain period or longer. For example, the charging control ECU 20 cancels the timer charging in a case where the fitting state is detected by a threshold of 3 or more after the charging gun 2 is fitted and then the half-fitting state is detected by a threshold of 1 or more.

FIG. 19 is an example in which the timer charging is cancelled by the user performing a predetermined operation (repeating short-pressing of the S3 switch 11) on the S3 switch 11 after the charging gun 2 is fitted (third example of the predetermined operation on the S3 switch 11).

For example, after fitting the charging gun 2 while pressing the S3 switch 11, the user performs a plurality of times an operation of pressing the S3 switch 11 for a predetermined period or longer and then releasing the S3 switch 11 for a predetermined period or longer. For example, the charging control ECU 20 cancels the timer charging in a case where, within a certain period from the fitting of the charging gun 2 while the S3 switch 11 is pressed, a case where a state in which the S3 switch 11 is not pressed is continued for a certain period or longer after the S3 switch 11 is pressed for a certain period or longer is detected a plurality of times. For example, the charging control ECU 20 cancels the timer charging in a case where the fitting state is detected by a threshold of 3 or more after the charging gun 2 is fitted and then the half-fitting state is detected a plurality of times (three times in the example of FIG. 19) by a threshold of 1 or more and 2 or less.

FIG. 20 is an example in which the timer charging is cancelled by the user performing a predetermined operation (operation of fitting the charging gun 2 while pressing the S3 switch 11 and then releasing the S3 switch 11) on the S3 switch 11 after the charging gun 2 is fitted (fourth example of the predetermined operation on the S3 switch 11).

For example, after fitting the charging gun 2 while pressing the S3 switch 11, the user presses the S3 switch 11 for a predetermined period or longer, and then releases the S3 switch 11 for a predetermined period or longer. For example, the charging control ECU 20 starts receiving the timer charging cancellation when "non-fitting→half-fitting" is detected as the fitting information. For example, the charging control ECU 20 cancels the timer charging in a case where the fitting state is detected by a threshold of 3 or more after "non-fitting→half-fitting" is detected and the half-fitting state is detected by a threshold of 1 or more.

<Erroneous Operation of S3 Switch During Removal of Charging Gun (Timer Charging Cancellation Prohibition>

Figure 21:
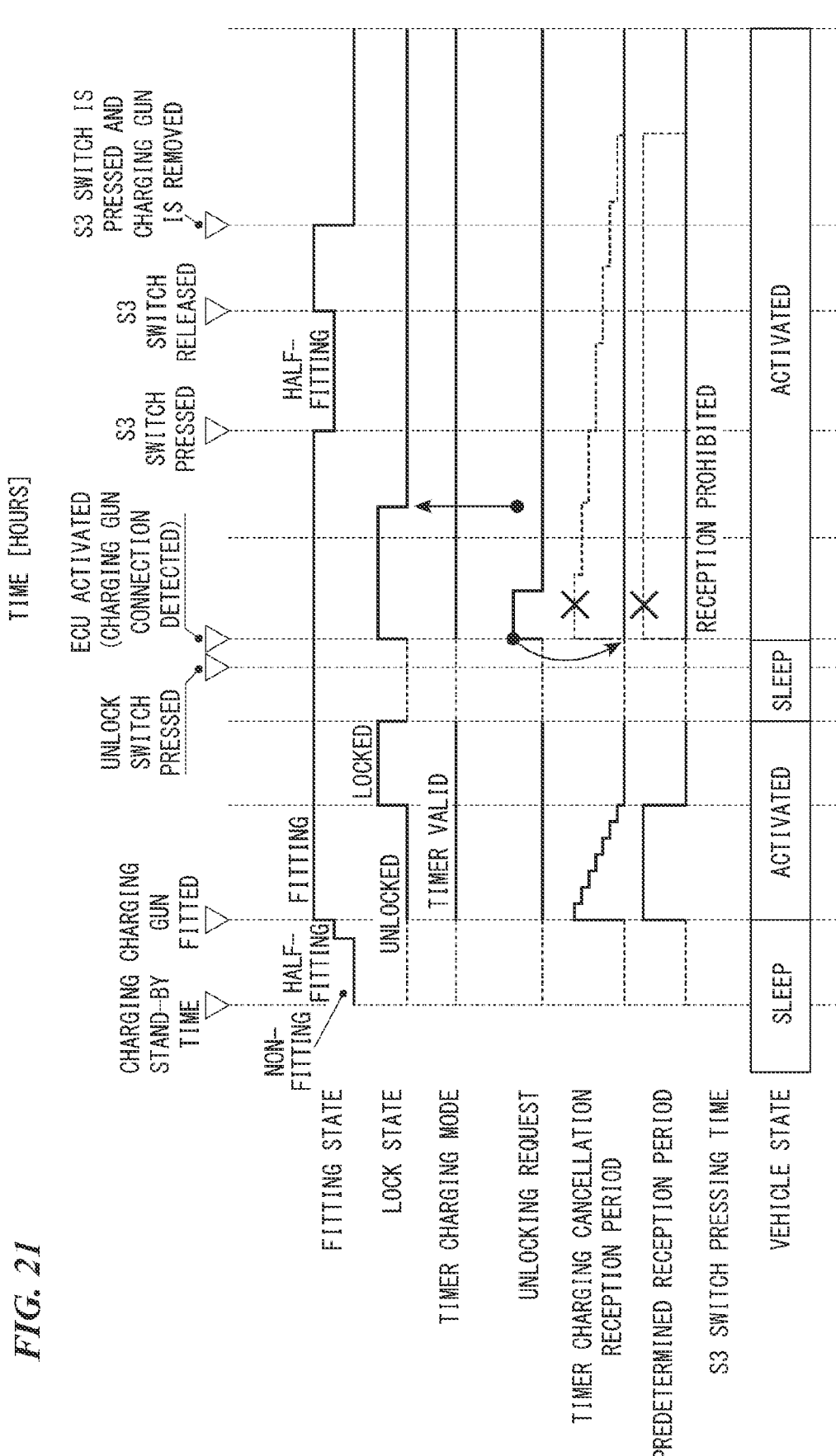
FIG. 21 is an explanatory diagram of an example of erroneous operation of a switch at the time of removal of the charging gun of the embodiment.

FIG. 21 illustrates an example of prohibiting the cancellation of the timer charging due to an erroneous operation of the S3 switch 11 by the user at the time of removing the charging gun 2 (an example of an erroneous switch operation at the time of removing the charging gun 2). In FIG. 21, time is indicated in the horizontal direction, and a fitting state, a lock state, a timer charging mode, an unlocking request, a reception period for the timer charging cancellation, a predetermined reception period, a S3 switch 11 pressing time, and a vehicle state are indicated in the vertical direction.

For example, when detecting the unlock operation, the charging control ECU 20 resets a reception period of timer charging cancellation (for example, a certain period after ECU activation by detection of connection of the plug 12 of the charging gun 2 is detected) in a case where the unlock operation is detected. For example, the charging control ECU 20 prohibits cancellation of timer charging even in a case where ECU activation by detection of connection of the plug 12 of the charging gun 2 is detected in a state before the removal operation of the charging gun 2. For example, it is possible to prevent the charging gun 2 from being locked by erroneously canceling the timer charging due to a user's erroneous operation (for example, press S3 switch 11→release S3 switch 11→press S3 switch 11) at the time of removing the charging gun 2. As a result, it is possible to prevent an event in which the user cannot remove the charging gun 2.

<Example of Abnormal Control by Off-Fixation of Switch of Charging Gun>

Figure 22:
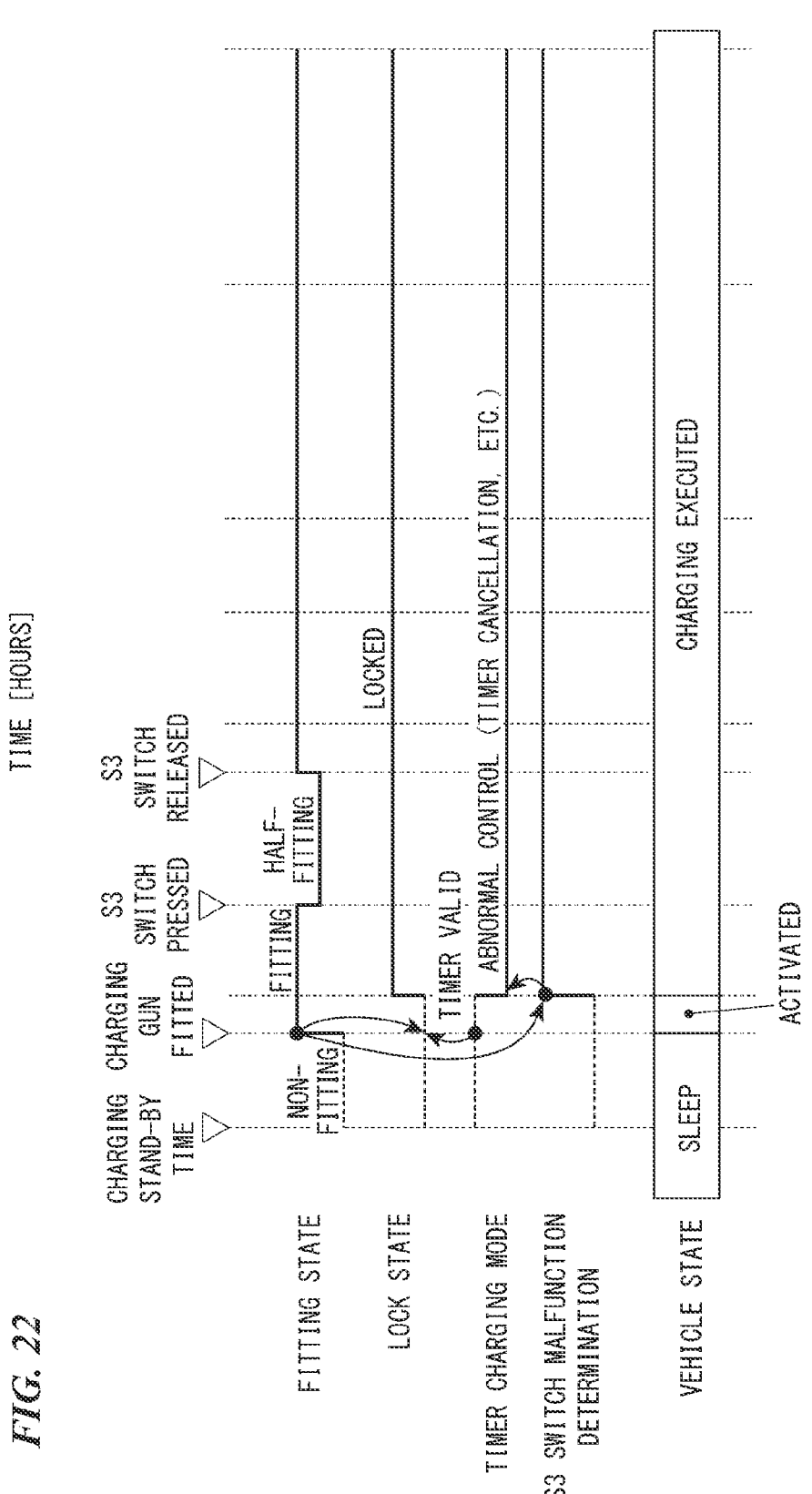
FIG. 22 is an explanatory diagram of an example of abnormal control performed when the switch of the charging gun of the embodiment is fixed at the off state.

FIG. 22 is an example of abnormal control (timer charging cancellation) by off-fixation of the S3 switch 11 of the charging gun 2. In FIG. 22, time is indicated in the horizontal direction, and a fitting state, a locking state, a timer charging mode, malfunction determination of the S3 switch 11, and a vehicle state are indicated in the vertical direction.

For example, the charging control ECU 20 determines abnormality (malfunction of the S3 switch 11) in a case where the fitting from the non-fitting is detected without detecting the half-fitting of the fitting information. In a case where the malfunction of the S3 switch 11 is determined, the charging control ECU 20 switches to a control mode for the time of abnormality. The charging control ECU 20 cancels the timer charging as the abnormal control.

<Operation and Effects>

As described above, the charging control system 1 of the embodiment described above is the charging control system 1 for the electric vehicle 3 capable of being charged from an external power source. The charging control system 1 includes the inlet 4 which is provided in the electric vehicle 3 and to which the charging gun 2 including the operable S3 switch 11 is connected, and the charging control ECU 20 capable of controlling the charging and performing a setting of timer charging. The charging control ECU 20 cancels the setting of the timer charging on the basis of a predetermined operation on the S3 switch 11 in a state in which the setting of the timer charging has been performed.

According to this configuration, when the user operates the S3 switch 11 in a state where the timer charging is set, the charging control ECU 20 cancels the setting of the timer charging on the basis of the predetermined operation on the S3 switch 11. Therefore, the timer charging setting can be canceled by a simple operation.

In the above embodiment, the charging control ECU 20 is capable of detecting fitting and half-fitting as connection states of the charging gun 2 with respect to the inlet 4, the charging gun 2 is capable of being in a state of the half-fitting on a basis of a predetermined operation of the S3 switch 11, and the charging control ECU 20 cancels the setting of the timer charging in a case where, after the fitting is detected, the half-fitting is detected and then the fitting is detected again.

According to this configuration, in a case where the half-fitting is detected between fittings that are temporally before and after the half-fitting, this is regarded as the predetermined operation of the S3 switch 11 based on the intention of the user, and the setting of the timer charging can be canceled. In addition, it is possible to suppress cancellation of the setting of the timer charging by an erroneous operation of the user as compared with the case where the setting of the timer charging is canceled only by the change from the fitting to the half-fitting.

In the above embodiment, the charging control ECU 20 cancels the setting of the timer charging when the S3 switch 11 is pressed for the second period or longer within the first period after the charging gun 2 is connected to the inlet 4.

According to this configuration, in a case where the S3 switch 11 is pressed for the second period or longer within the first period, this is regarded as the predetermined operation of the S3 switch 11 based on the intention of the user, and the setting of the timer charging can be canceled. In addition, it is possible to suppress cancellation of the setting of the timer charging by an erroneous operation of the user as compared with the case where the setting of the timer charging is canceled only when the S3 switch 11 is pressed for a period shorter than the second period within the first period.

In the above embodiment the charging control ECU 20 cancels the setting of the timer charging in a case where a state in which the S3 switch 11 is not pressed is continued for a third period or longer after the S3 switch 11 is pressed for the second period or longer within the first period.

According to this configuration, in a case where a state in which the S3 switch 11 is not pressed is continued for a third period or longer after the S3 switch 11 is pressed for the second period or longer within the first period, this is regarded as a predetermined operation on the S3 switch 11 based on the intention of the user, and the setting of the timer charging can be cancelled. In addition, it is possible to suppress cancellation of the setting of the timer charging by an erroneous operation of the user as compared with the case where the setting of the timer charging is canceled only when the S3 switch 11 is pressed for the second period or longer within the first period.

In the above embodiment, the charging control system 1 starts the charging after the setting of the timer charging is cancelled, and further includes the lock mechanism 50 that locks the charging gun 2 and the inlet 4, and the unlock switch 60 for releasing the lock, and the charging control ECU 20 restricts the cancellation of the setting of the timer charging in a case where the unlock switch 60 is pressed.

According to this configuration, in a case where the unlock switch 60 is pressed, the release of the lock between the charging gun 2 and the inlet 4 is regarded as being based on the intention of the user, and the cancellation of the setting of the timer charging can be restricted.

In the above embodiment, the charging control ECU 20 functions as a determination unit that determines an abnormality related to the detection of the fitting state, and the charging control ECU 20 switches to the control mode for abnormality in a case where the abnormality related to the detection of the fitting state has been determined.

According to this configuration, when the abnormality related to the detection of the fitting state is determined, the control mode can be switched to the control mode for abnormality.

In the above embodiment, the charging control ECU 20 determines that there is an abnormality in a case where the charging control ECU 20 does not detect the half-fitting when connecting the charging gun 2 to the inlet 4 or when detaching the charging gun 2 from the inlet 4.

According to this configuration, in a case where the half-fitting is not detected when the user connects the charging gun 2 to the inlet 4 or when the user detaches the charging gun 2 from the inlet 4, this can be determined as an abnormality regarding the detection of the fitting state.

Modification Examples

In the above embodiment, the timer charging reservation (timer charging setting) in the charging execution time period has been described as an example of the charging schedule setting, but the present invention is not limited to this. For example, the charging schedule setting may be a charging ending SOC setting. For example, in a case where the charging ending SOC is set to 80%, the charging ending SOC may be changed to 100% when a predetermined operation of the switch is received. For example, the embodiment of the charging schedule setting can be changed according to required specifications.

Although an example in which the charging control ECU is capable of detecting fitting and half-fitting as connection states of the charging gun with respect to the inlet, the charging gun is capable of being in a state of the half-fitting on a basis of a predetermined operation of the S3 switch, and the charging control ECU cancels the setting of the timer charging in a case where, after the fitting is detected in the above embodiment, the half-fitting is detected and then the fitting is detected again has been described above, the configuration is not limited to this. For example, the charging control ECU can detect a first connection signal (first voltage value) and a second connection signal (second voltage value) as the connection states of the charging gun with respect to the inlet, the charging gun can transmit the second connection signal on the basis of a predetermined operation of the S3 switch, and the charging control ECU may cancel the setting of the timer charging in a case where, after detecting the first connection signal, the second connection signal is detected and then further the first connection signal is detected again. For example, the control unit may cancel the schedule setting on the basis of a predetermined operation of the switch included in the charger in a state where the schedule setting has been performed. For example, the embodiment of cancellation of the schedule setting can be changed in accordance with required specifications.

Although an example in which the charging control ECU cancels the setting of the timer charging in a case where a state in which the S3 switch is not pressed is continued for a third period or longer after the S3 switch is pressed for the second period or longer within the first period has been described in the above embodiment, the configuration is not limited to this. For example, a configuration in which the charging control ECU cancels the setting of the timer charging only when the S3 switch is pressed for the second period or longer within the first period may be employed. For example, the embodiment of the pressing time of the S3 switch in cancellation of the schedule setting can be changed in accordance with required specifications.

Although an example in which the charging control system starts the charging after the setting of the timer charging is cancelled, and further includes the lock mechanism that locks the charging gun and the inlet, and the unlock switch for releasing the lock, and the charging control ECU restricts the cancellation of the setting of the timer charging in a case where the unlock switch is pressed has been described in the above embodiment, the configuration is not limited to this. For example, the charging control system does not have to include the lock mechanism. For example, the charging control system does not have to include the unlock switch. For example, when the unlock switch is pressed, the charging control ECU does not have to restrict the cancellation of the setting of the timer charging. For example, the constitution mode and the control mode of the charging control system can be changed in accordance with required specifications.

Although an example in which the charging control ECU functions as a determination unit that determines an abnormality related to the detection of the fitting state, and the charging control ECU switches to the control mode for abnormality in a case where the abnormality related to the detection of the fitting state has been determined has been described in the above embodiment, the configuration is not limited to this. For example, the charging control ECU does not have to function as a determination unit that determines an abnormality related to the detection of the fitting state. For example, the determination unit may be provided separately from the charging control ECU. For example, a configuration in which when the abnormality related to the detection of the fitting state is determined, the charging control ECU does not have to switch to the control mode for abnormality. For example, the installation mode of the charging control ECU can be changed in accordance with required specifications.

Although a charging control system of an electric vehicle capable of being charged from an external power source by a charging gun (an example of a charger) has been described in the above embodiment, the configuration is not limited to this. For example, the charger does not have to be a charging gun (gun type). For example, the charger may be a charging connector (connector type) provided at a tip of a charging cable or the like. For example, a mode of the charger can be changed in accordance with required specifications. For example, the connection portion to which the charger is connected does not have to be the inlet provided in a front portion of the electric vehicle. For example, the connection portion to which the charger is connected may be the inlet provided in a rear portion or a side portion of the electric vehicle. For example, the mode of the connection portion to which the charger is connected can be changed in accordance with the required specifications. For example, it suffices as long as the charging control system is a charging control system for an electric vehicle capable of being charged from an external power source, and the charging control system includes a connection portion which is provided in the electric vehicle and to which a charger including an operable switch is connected, and a control unit capable of controlling the charging and performing a schedule setting of the charging. The control unit cancels the schedule setting on a basis of a predetermined operation of the switch in a state in which the schedule setting has been performed. For example, the mode of the charging control system can be changed in accordance with required specifications.

Although preferable embodiments of the present invention have been described above, the present invention is not limited to these, and addition, omission, substitution, and other changes of constituents can be made without departing from the gist of the present invention, and the above-described modification examples can be appropriately combined.

What is claimed is:

1. A charging control system for an electric vehicle capable of being charged from an external power source, the charging control system comprising:

a connection portion which is provided in the electric vehicle and to which a charger including an operable switch is connected; and a control unit capable of controlling the charging and performing a schedule setting of the charging, wherein the control unit cancels the schedule setting on a basis of a predetermined operation of the switch in a state in which the schedule setting has been performed, and wherein the control unit detects fitting and half-fitting as connection states of the charger with respect to the connection portion, and the control unit cancels the schedule setting in a case where, after the fitting is detected, the half-fitting is detected for a predetermined period or longer and then the fitting is detected again.

2. The charging control system according to claim 1, wherein the charger is capable of being in the connection state of the half-fitting on a basis of the predetermined operation of the switch.

3. The charging control system according to claim 2, wherein the control unit cancels the schedule setting in a case where the switch is pressed for a second period or longer within a first period after the charger is connected to the connection portion.

4. The charging control system according to claim 3, wherein the control unit cancels the schedule setting in a case where a state in which the switch is not pressed is continued for a third period or longer after the switch is pressed for the second period or longer within the first period.

5. The charging control system according to claim 3, wherein the charging control system starts the charging after the schedule setting is cancelled, the charging control system further includes a lock mechanism that locks the charger and the connection portion, and an unlock switch for releasing the lock, and the control unit restricts the cancellation of the schedule setting in a case where the unlock switch is pressed.

6. The charging control system according to claim 2, further comprising a determination unit that determines an abnormality related to detection of the fitting state, wherein the control unit switches to a control mode for the abnormality in a case where the determination unit has determined the abnormality.

7. The charging control system according to claim 6, wherein the determination unit determines the abnormality in a case where the control unit does not detect the half-fitting when connecting the charger to the connection portion or when detaching the charger from the connection portion.

\* \* \* \* \*